United States Patent [19]

Greenberg et al.

[11] Patent Number: 4,928,250

[45] Date of Patent: May 22, 1990

[54] SYSTEM FOR DERIVING RADIATION IMAGES

[75] Inventors: Donald P. Greenberg; Michael F. Cohen; Eric A. Haines, all of Ithaca, N.Y.

[73] Assignee: Hewlett-Packard Company, Palo Alto, Calif.

[21] Appl. No.: 881,067

[22] Filed: Jul. 2, 1986

[51] Int. Cl.$^5$ .............................................. G06F 15/66
[52] U.S. Cl. .................................. 364/518; 364/521; 340/747
[58] Field of Search ........... 364/521, 518, 522, 413.13, 364/413.14; 340/747, 750; 378/901

[56] References Cited

U.S. PATENT DOCUMENTS

| | | | |
|---|---|---|---|
| 4,343,037 | 8/1982 | Bolton | 364/521 |
| 4,609,993 | 9/1986 | Shimizu | 364/522 |
| 4,625,289 | 11/1986 | Rockwood | 364/522 |
| 4,734,690 | 3/1988 | Waller | 340/729 |
| 4,855,934 | 8/1989 | Robinson | 364/521 |

OTHER PUBLICATIONS

Phong, T. B., "Illumination for Computer Generated Pictures", Communications of the ACM, Jun. 75-pp. 311/317.

Govraud, H. "Continuous Shading of Curved Surfaces" IEEE Trans. on Computers-Jun. 1971, pp. 623-629.

Weghorst, H.; Hooper, G.; and Greenberg, D., "Improved Computational Methods for Ray Tracing," ACM Transactions on Graphics, vol. 3, No. 1, Jan. 1984, pp. 52-69.

Williams, L.; "Casting Curved Shadows on Curved Surfaces," ACM Computer Graphics (Siggraph Proc. '78) Vol. 12, No. 3, 1978, pp. 270-274.

Haines, E. A.; and Greenberg, D. P.; "The Light Buffer: A Shadow-Testing Accelerator," IEEE Computer Graphics & Applications, vol. 6, No. 9, Sep. 1986, pp. 6-16.

Foley, J. D.; and Van Dam, A.; Fundamentals of Interactive Computer Graphics, Addison-Wesley, 1983, pp. 560-561.

Newman, W. M.; and Sproull, R. F.; Principles of Interactive Computer Graphics, McGraw-Hill, 1979, pp. 369-371.

Goral, C. M.; Torrance, K. E.; Greenberg, D. P.; Battaile, B.; "Modeling the Interaction of Light Between Diffuse Surfaces," ACM Computer Graphics (Siggraph Proc '84) vol. 18, No. 3, Jul. 1984, pp. 213–222.

Cohen, M. F. and Greenberg, D. P.; "The Hemi-Cube: A Radiosity Solution for Complex Environments," ACM Computer Graphics (Siggraph Proc '85) vol. 19, No. 3, 1985, pp. 31–40.

(List continued on next page.)

Primary Examiner—Gary V. Harkcom
Assistant Examiner—Phu K. Nguyen

[57] ABSTRACT

In an algorithm for deriving radiation images, where view independent radiation calculations are precomputed so that they do not need to be repeated for every view of the same environment. To find the form factors for radiosity techniques, a hemi-cube is constructed around the surface with grid cells defined for all faces on the hemi-cube. All other surfaces in the environment are projected onto the hemi-cube to facilitate the form factor calculations. A novel ray-tracing technique is disclosed where a light buffer in the form of a cube is constructed around each radiation source and grid cells are defined on the faces of the cube. Surfaces in the environment are projected onto the cube and the depths from the source are stored for each grid cell to facilitate shadow testing. Light reflected off of the viewed surface from another surface may be modeled by determining mirror positions of the viewer and the image plane. Instead of storing the depths of surfaces from the viewer or the radiation source, the identity of the polygons in the environment are stored instead to speed up the calculations. Scan conversion hardware is used to accelerate each of these operations. In a graphics pipeline, a feedback path is provided from the image processor to the CPU memory to store the result of the form factor or light buffer pre-computations to speed up the radiosity and ray-tracing calculations by several orders of magnitude.

53 Claims, 11 Drawing Sheets

OTHER PUBLICATIONS

Nishita, T. and Nakamae, E.; "Continuous Tone Representation of Three-Dimensional Objects Taking Account of Shadows and Interreflection," *ACM Computer graphics* (Sigraph Proc. '85) vol. 19, No. 3, 1985, pp. 23–30.

Cohen, M. F.; Greenberg, D. P.; Immel, D. S.; and Phillip, J. B.; "An Efficient Radiosity Approach for Realistic Image Synthesis," *IEEE Computer Graphics & Applications*, vol. 5, No. 3, Mar. 1986, pp. 26–36.

Immel, D. S.; Cohen, M. F.; Greenberg, D. P.; "A Radiosity Method for Non-Diffuse Environments," *ACM Computer Graphics* (Siggraph Proc '86) vol. 20, No. 4, 1986, pp. 133–142.

Whitted, T., "An Improved Illumination Model for Shaded Display," *Communication of the ACM*, vol. 23, No. 6, Jun. 1980, pp. 343–349.

Rubin, S. M.; and Whitted, T.; "A 3-Dimensional Representation for Fast Rendering of Complex Scenes," *ACM Computer Graphics* (Siggraph Proc. '80), vol. 14, No. 3, Jul. 1980, pp. 110–116.

*Principles of Interactive Computer Graphics*, Newman and Sproull, McGraw Hill, 1979, pp. 232–243, 286–287.

*Fundamentals of Interactive Computer Graphics*, Foley and VanDam, Addison-Wesley, 1982, pp. 456–462.

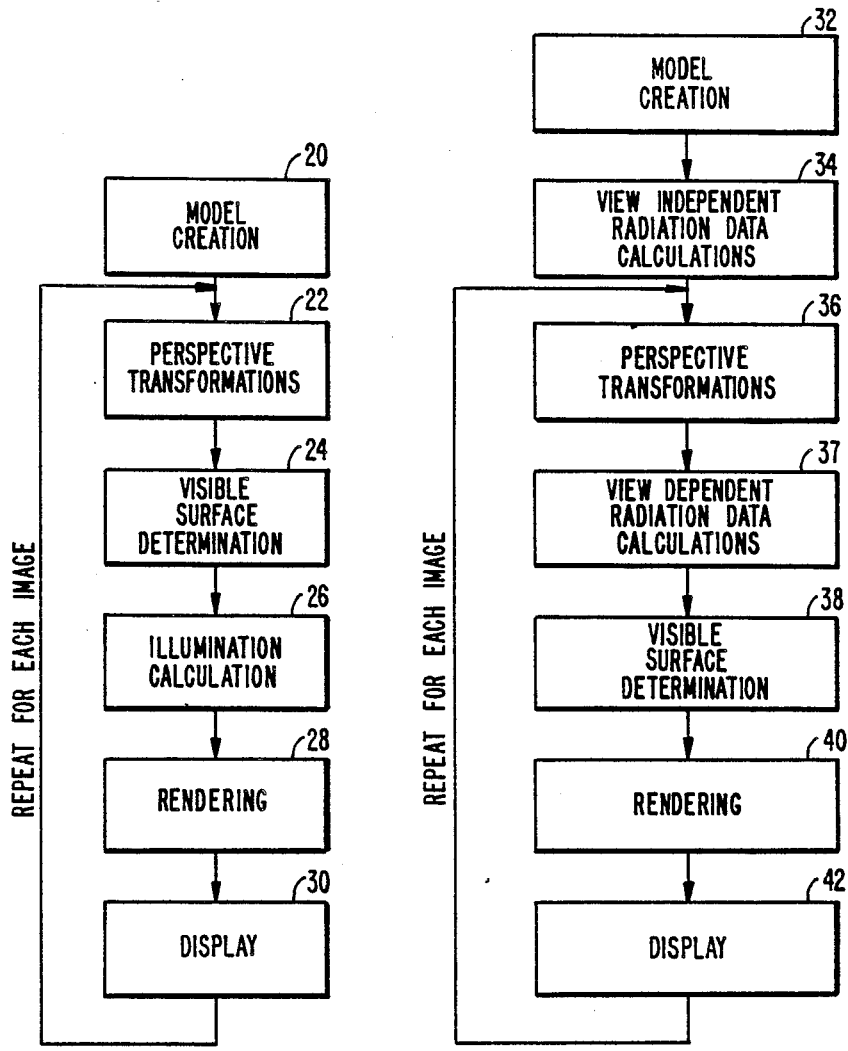
FIG.__IA. PRIOR ART    FIG.__2.
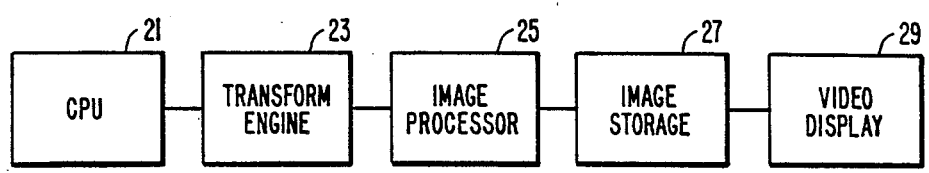
FIG.__IB. PRIOR ART

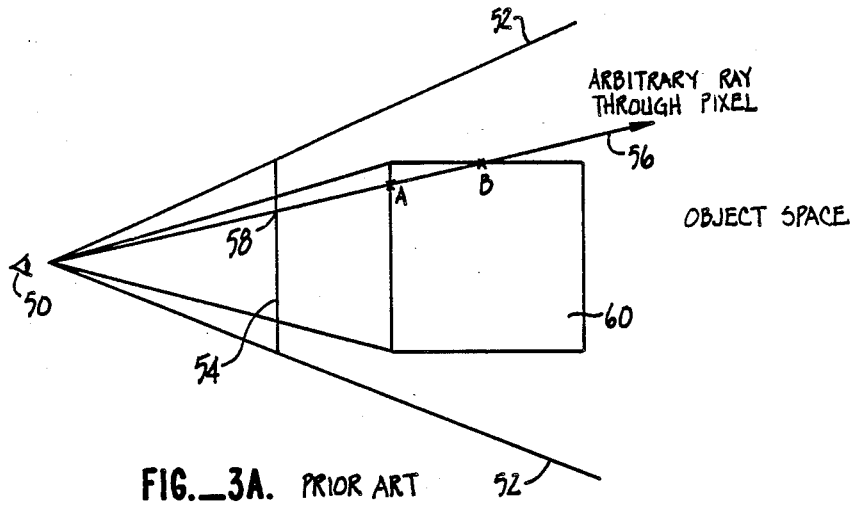
FIG._3A. PRIOR ART
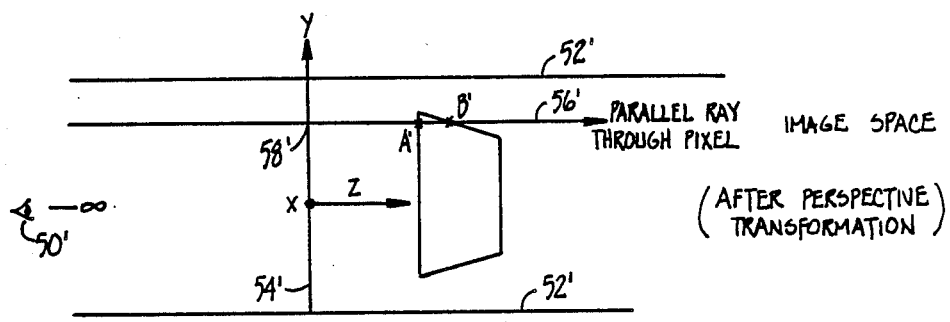
FIG._3B. PRIOR ART
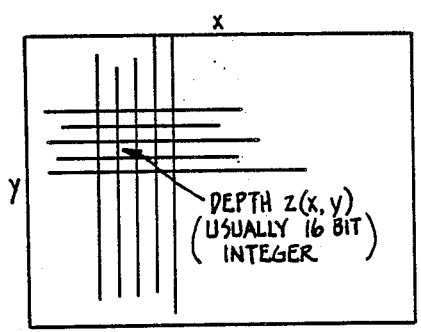
FIG._3C.
DEPTH BUFFER
PRIOR ART
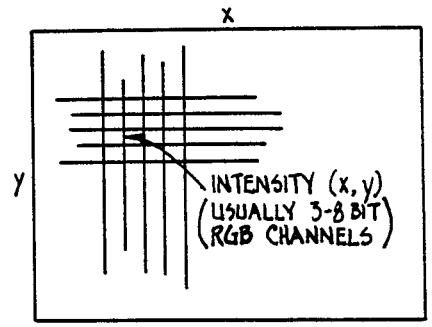
FIG._3D.
INTENSITY BUFFER
(FRAME BUFFER)

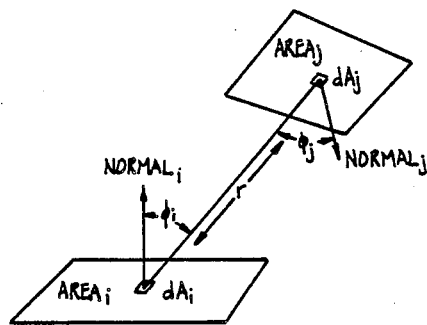
FIG._4A. PRIOR ART
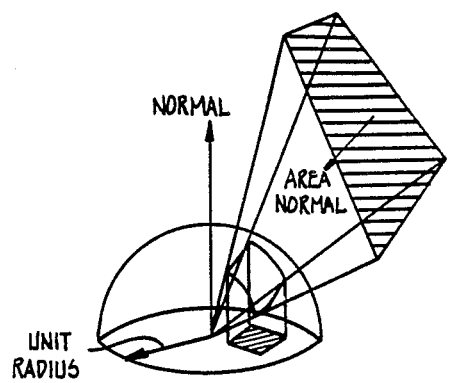
FIG._4B. PRIOR ART
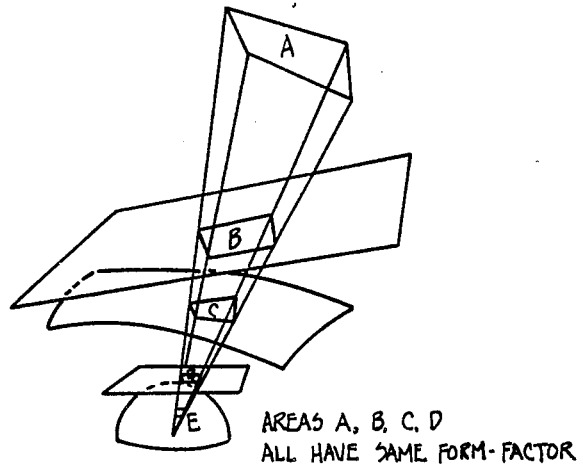
AREAS A, B, C, D ALL HAVE SAME FORM-FACTOR
FIG._5A.

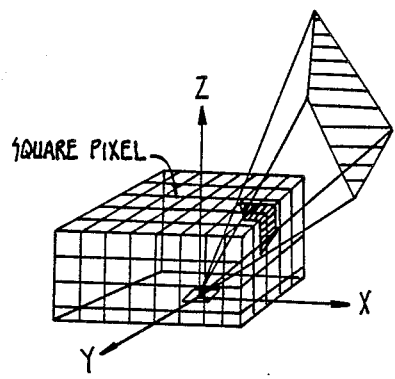
FIG._5B.
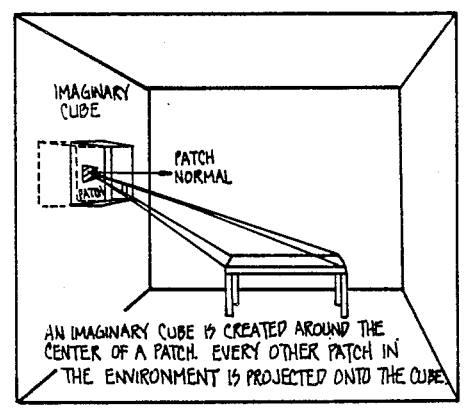
AN IMAGINARY CUBE IS CREATED AROUND THE CENTER OF A PATCH. EVERY OTHER PATCH IN THE ENVIRONMENT IS PROJECTED ONTO THE CUBE.
FIG._5C.
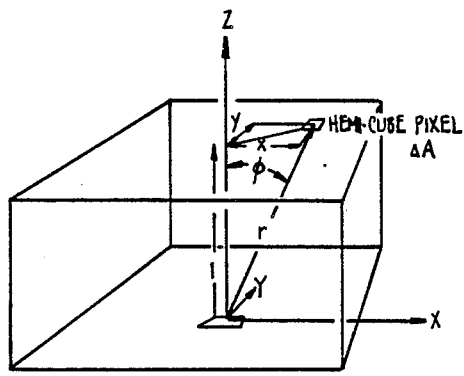
TOP OF HEMI-CUBE
FIG._5D.
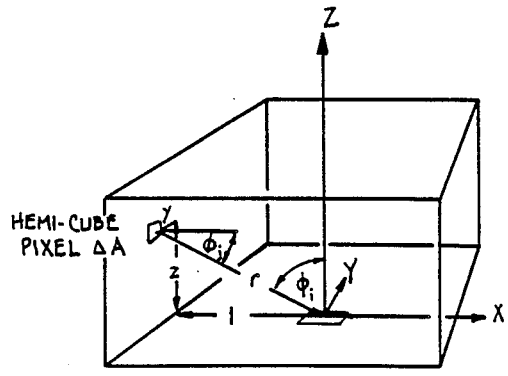
SIDE OF HEMI-CUBE
FIG._5E.

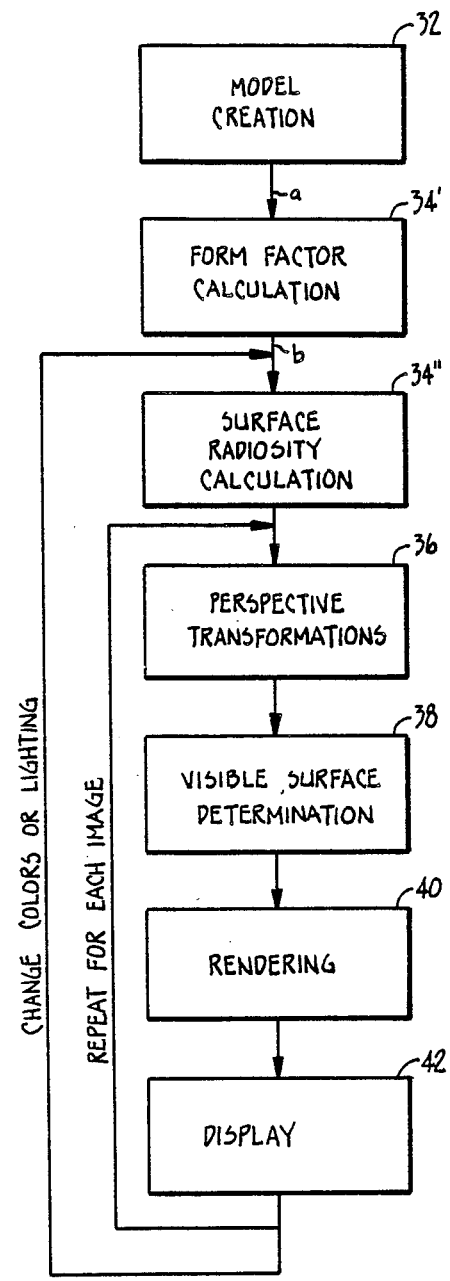
FIG._6.

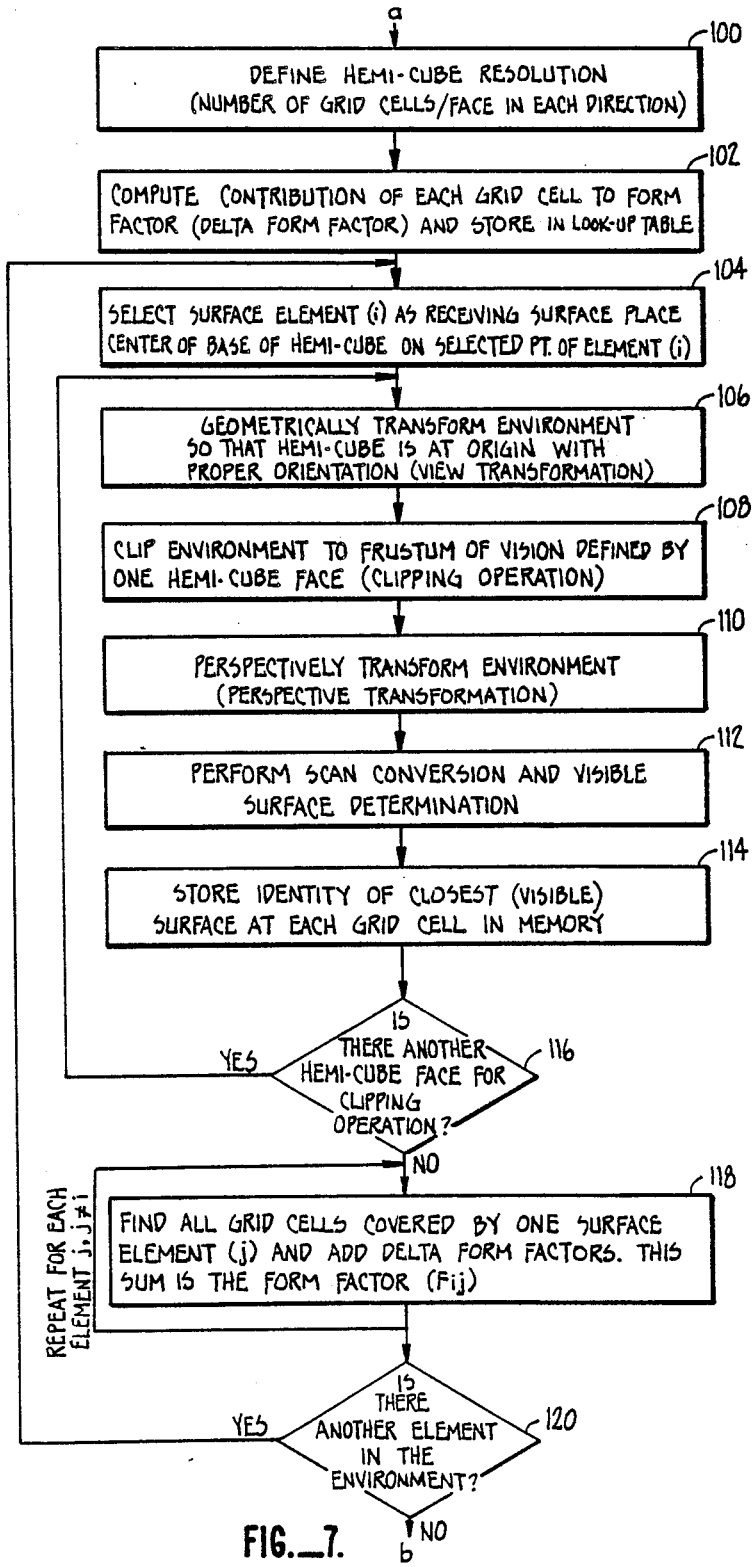
FIG. _7.

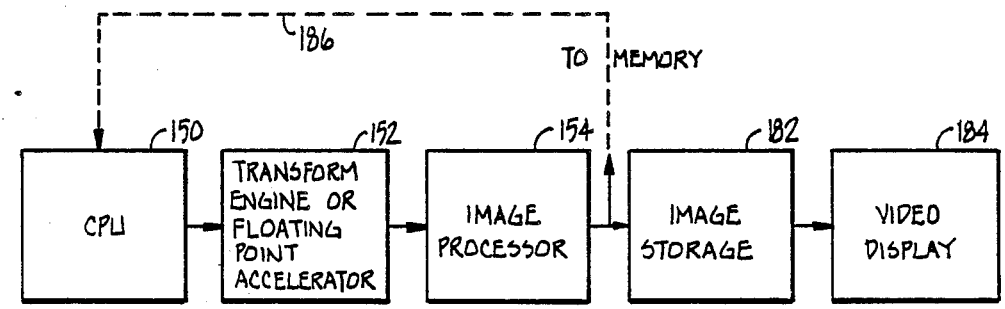
FIG._8.
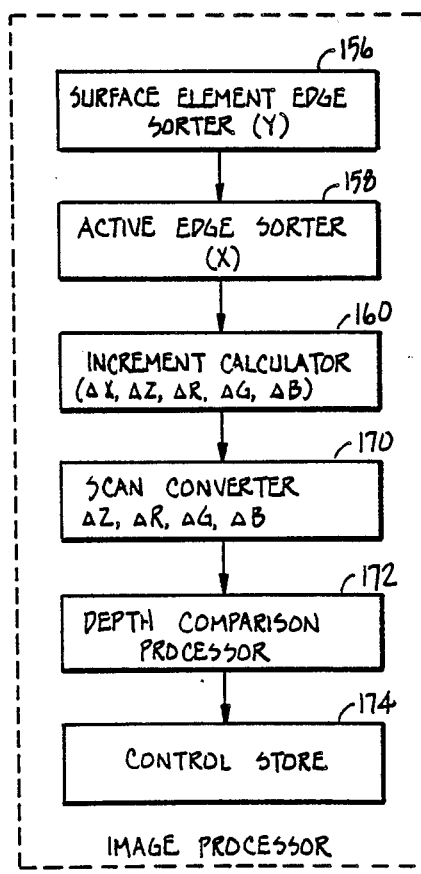
FIG._9.

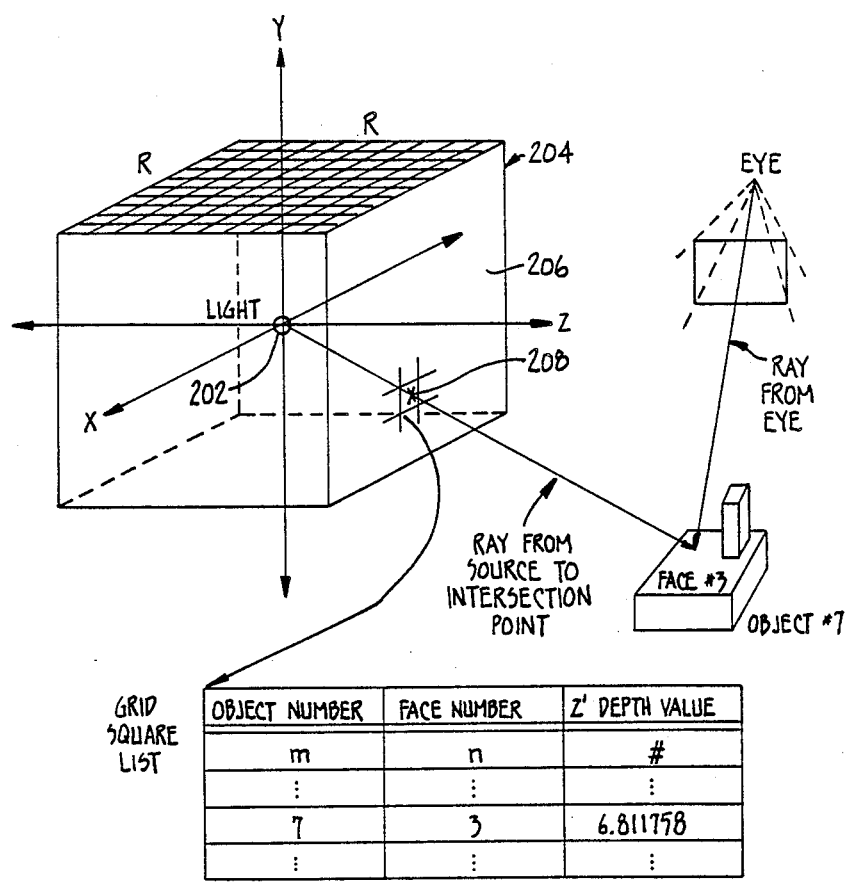
FIG.—10A.

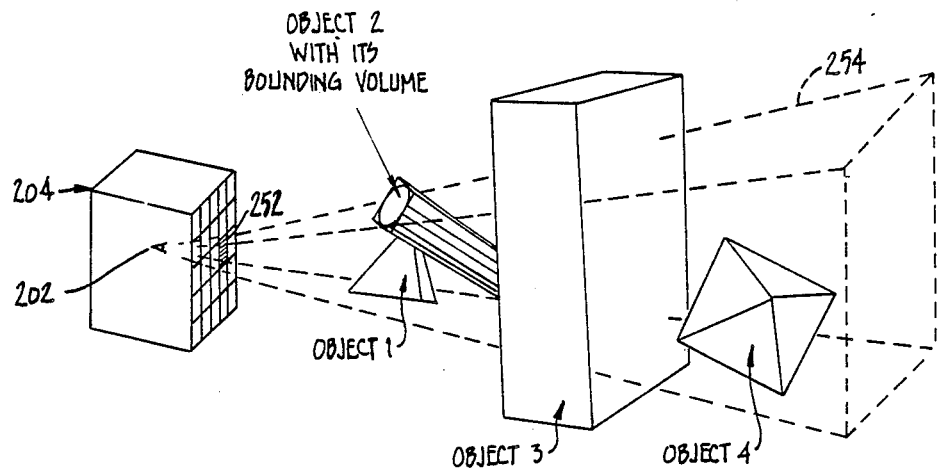
| RECORD I | | | RECORD II | | | RECORD III | | |
|---|---|---|---|---|---|---|---|---|
| OBJ | FACE | Z' DEPTH | OBJ | FACE | Z' DEPTH | OBJ | FACE | Z' DEPTH |
| 1 | 2 | 1.28 | 1 | 2 | 1.28 | 1 | 2 | 1.28 |
| 1 | 3 | 1.28 | 1 | 3 | 1.28 | 1 | 3 | 1.28 |
| 2 | 1 | 1.56 | -2 | 0 | 1.56 | -2 | 0 | 1.56 |
| 2 | 6 | 1.56 | 2 | 1 | 1.56 | 2 | 1 | 1.56 |
| 2 | 7 | 1.99 | 2 | 6 | 1.56 | 2 | 6 | 1.56 |
| 2 | 4 | 2.05 | 2 | 7 | 1.99 | 2 | 7 | 1.99 |
| 2 | 5 | 2.10 | 2 | 4 | 2.05 | 2 | 4 | 2.05 |
| 2 | 8 | 2.20 | 2 | 5 | 2.10 | 2 | 5 | 2.10 |
| 3 | 4 | 3.69 | 2 | 8 | 2.20 | 2 | 8 | 2.20 |
| 4 | 1 | 4.48 | 3 | 4 | 3.69 | 3 | 4 | 3.69 |
| 4 | 2 | 4.48 | 4 | 1 | 4.48 | 3 | 0 | -4.15 |
| 4 | 7 | 4.48 | 4 | 2 | 4.48 | | | |
| 4 | 8 | 4.48 | 4 | 7 | 4.48 | | | |
| | | | 4 | 8 | 4.48 | | | |
I ⟶ II ⟶ III
INSERTION OF BOUNDING VOLUME    INSERTION OF FULL OCCLUSION AND PRUNING
FIG._10B.

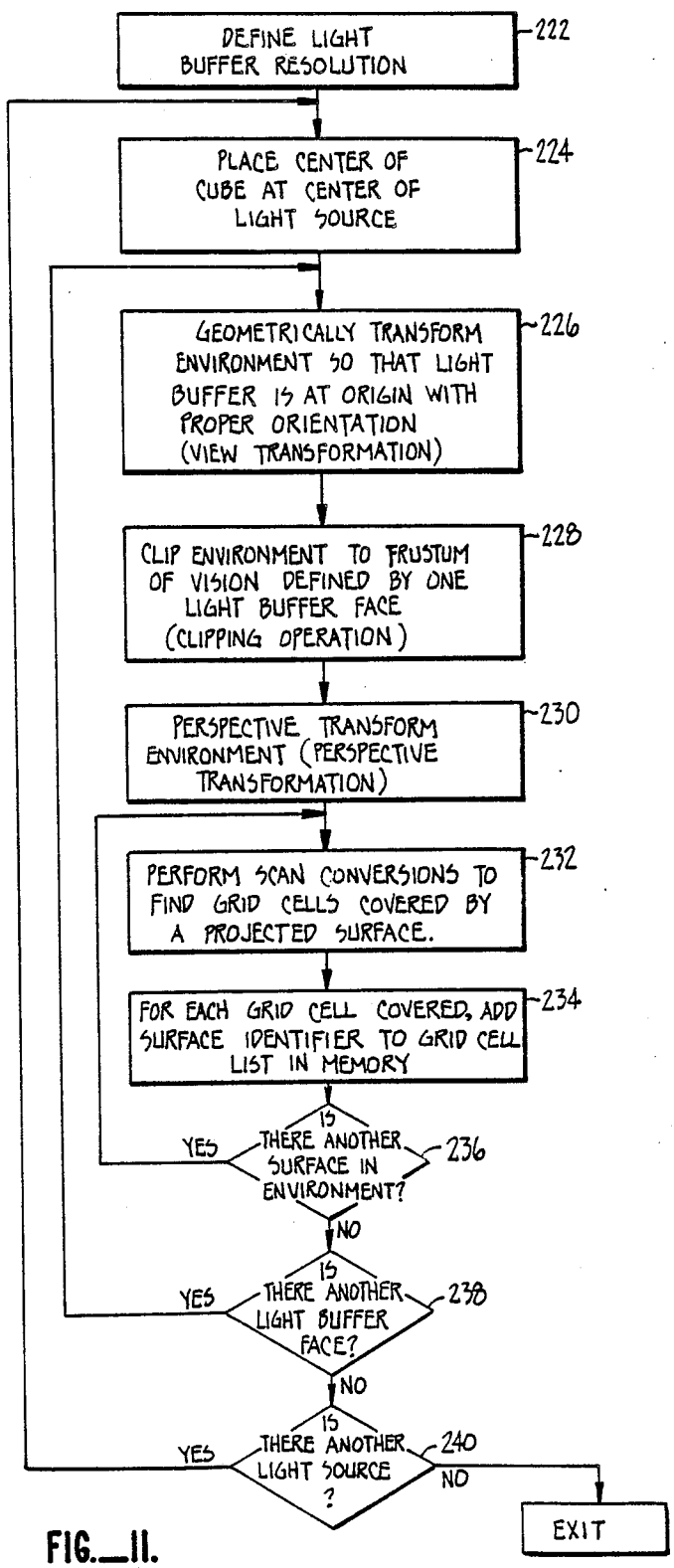
FIG._11.

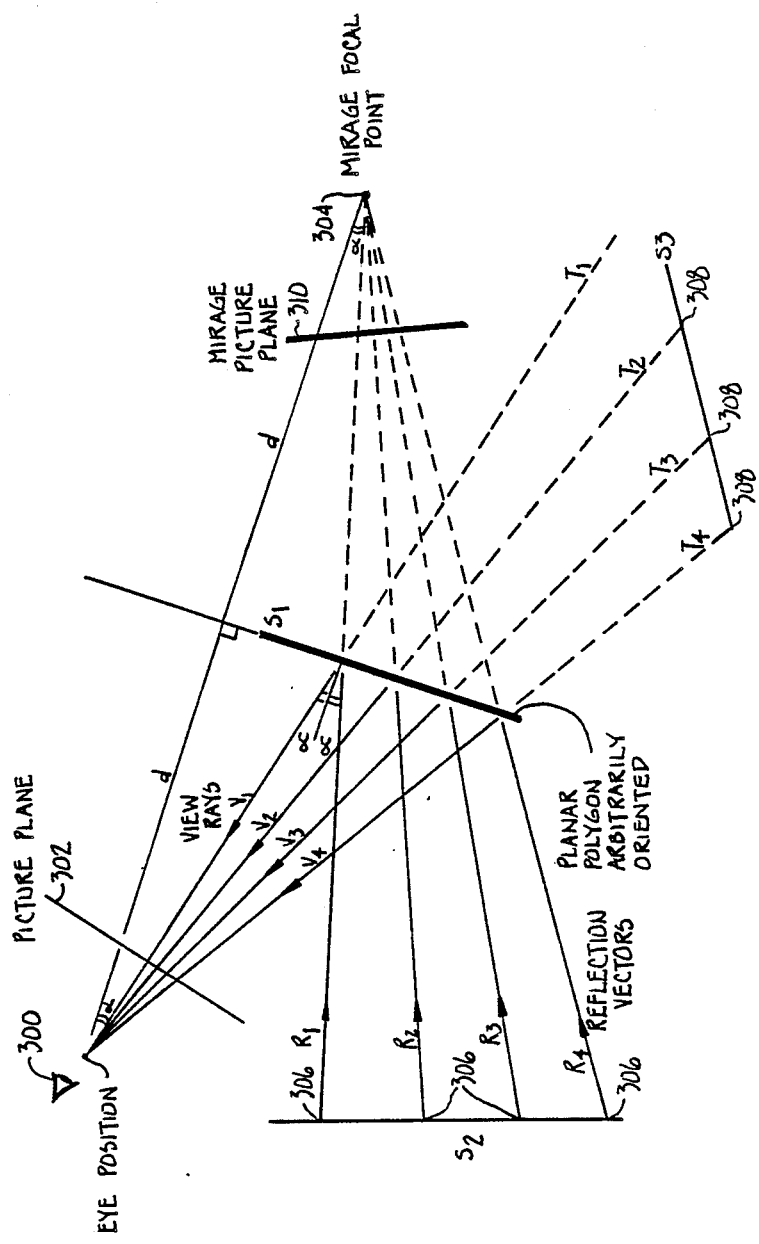
FIG._12.

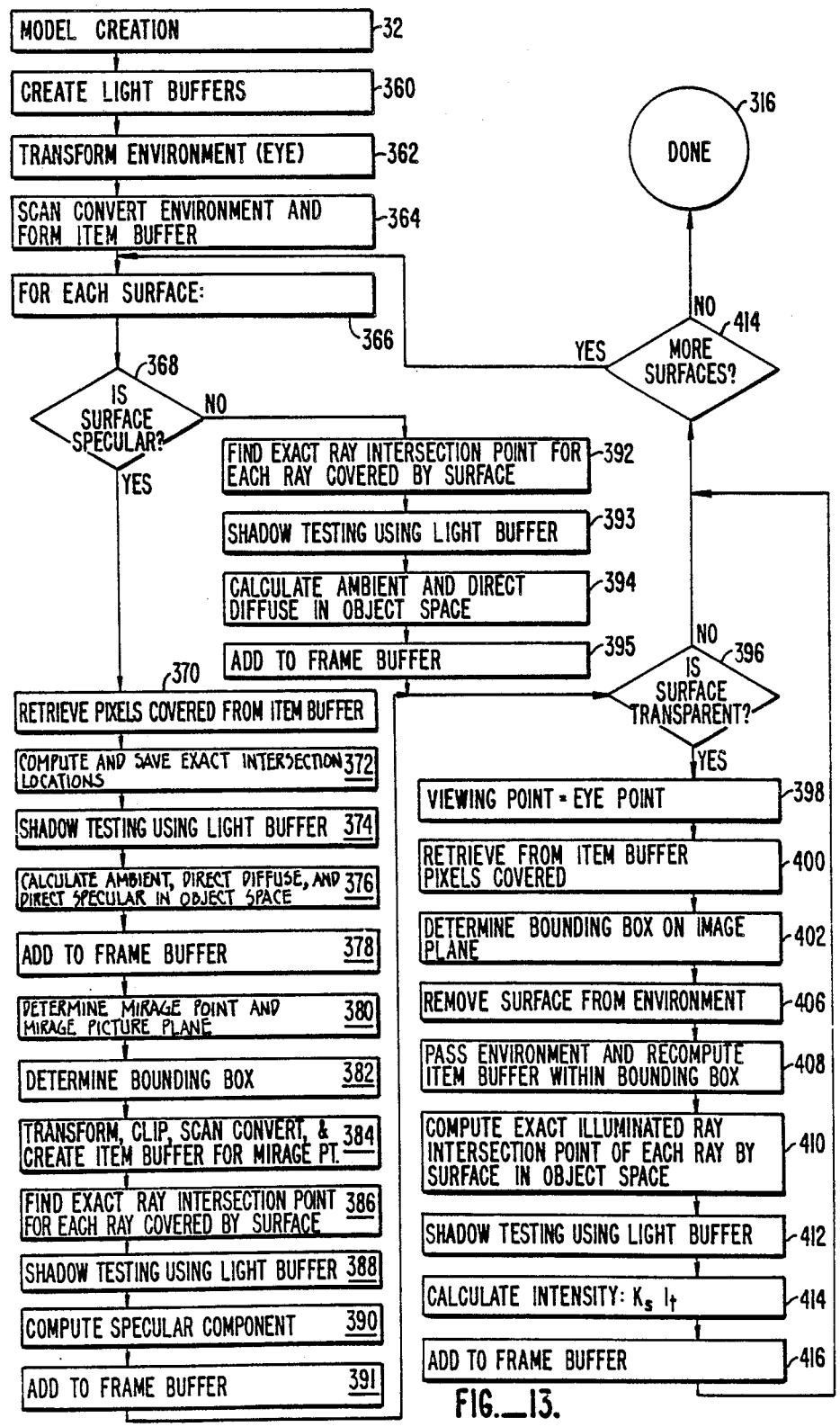
FIG._13.

4,928,250

SYSTEM FOR DERIVING RADIATION IMAGES

BACKGROUND OF THE INVENTION

1. Field of the Invention

This invention relates to a system for deriving radiation images. The system is particularly useful in computer, graphics applications.

2. Description of the Related Art

Much work has been done in the computer processing of three-dimensional data to produce realistic two-dimensional pictures. In order to create realistic images, the global illumination which is derived from the interreflection of light within an environment must be modeled correctly. In most conventional models, a constant ambient factor is used as the global illumination term. Shadows and intersurface illumination are not simulated. Although fast, such an approach is not quite satisfactory, particularly where the simulated environment includes complex lighting and object arrangements.

The majority of surfaces in real environments are diffuse reflectors; that is, an incident beam of light is reflected or scattered in all directions within the entire hemisphere above the reflecting surface. A special case of diffuse reflection is the so-called "ideal" diffuse or "Lambertian" reflection. In this case, the incident light is reflected from a surface with equal intensity in all directions. A model assuming ideal diffuse reflection may be adequate for many computer graphics applications.

Methods have previously been developed to determine the exchange of thermal radiant energy between surfaces in an enclosure. See *Thermal Radiation Heat Transfer*, by Robert Siegel and John R. Howell, Hemisphere Publishing Corp., 1978 and *Radiation Heat Transfer*, by E. M. Sparrow and R. D. Cess, Hemisphere Publishing Corp., 1978. The application of the same concept to the exchange of optical energy in enclosures, known as the radiosity method in computer graphics, is outlined in the paper "Modeling the Interaction of Light Between Diffuse Surfaces," by Cindy M. Goral et al., *ACM Computer Graphics (Proceedings 1984)*, pp. 213–222. In contrast to conventional methods, the radiosity method models the interreflection of light between surfaces in an environment producing shadows and providing more realistic images, particularly where the environment includes many diffuse surfaces.

Ray tracing techniques have also been developed as a model for light reflections which are assumed to be specular. See "An Improved Illumination Model for Shaded Display" by Turner Whitted in *Communications of the ACM*, vol. 23, No. 6, June 1980. As in the radiosity method, ray tracing accounts for shadows and interreflection of light between surfaces in an environment and produces more realistic images than conventional methods.

While the radiosity and ray tracing methods provides better images than the conventional method, these techniques require many computer hours using a commercially available mini-computer. The illumination calculations in these techniques may require considerable time since the surfaces visible to a viewer must be tested to determine whether they are in shadow or not with respect to one or more light sources. Hence, much computer time is required to produce one image. It is thus desirable to provide improved radiosity and ray tracing systems which are faster than known methods.

In the conventional, radiosity and ray tracing methods discussed above, a number of steps are required to produce one image of an environment. Frequently, a number of images from different viewing locations may be desired of the static environment. In such event, the steps for producing an image in the conventional and ray-tracing methods must be repeated in their entirety to produce additional images. In the radiosity approach, only some of the steps need to be repeated. In general, it is desirable to provide methods where the steps required for the first image need not be entirely repeated for subsequent images to accelerate the process for producing different images of the same environment.

SUMMARY OF THE INVENTION

This invention is based on the observation that, where two or more images of the same environment taken from different viewing positions are desired, some of the steps in the conventional process need not be repeated so that much time can be saved. Thus, if the environment remains static, at least part of the illumination calculations will not change when the viewer moves.

One aspect of the invention is directed towards a method for creating a radiation image of an environment from an observation location. Radiation, in this case, may be light, heat, sound, radioactive emission or still other types of energy emission. The method comprises the step of defining a model of the surfaces and radiation sources in the environment and defining and determining the radiation data of the environment, where the radiation data determined is independent of the viewing location. Where the radiation concerned is light, the radiation data relates to the illumination of the surfaces in the environment. The method further comprises the step of performing the perspective transformations so that the radiation arriving at the location from the environment are substantially in parallel rays. The method also includes the step of determining the surfaces or portions thereof from which radiation is observable at the location and the intensities of such radiation using the radiation data. The radiation image is then displayed.

In the above method, it will be noted that the view-independent intensity calculations, which are a part of the radiation data determining step, may be performed separately from the geometric computations involved in the perspective transformations. These calculations may be performed in parallel or in advance of the geometric computations since these calculations are view-independent. Only the view dependent (specular) portions of the calculations need to be done for each observation location.

Another aspect of the invention is directed towards an improved system for measuring and computing the radiosities of surfaces in an environment. The diffusive radiation received by a second surface from a first surface in an environment is defined as the form factor from the first surface towards the second surface. This aspect of the invention involves a method for defining the form factor for diffusive radiation received by a second surface from a first surface. The method comprises defining a hemi-polyhedron having a base substantially coplanar with a first surface and grid cells on each plane of the hemi-polyhedron. The method further comprises projecting an image of the first surface on to each said plane of the polyhedron as viewed from the second surface and determining the form factor. Once the form factors for all surfaces in the environment receiving radiation have been determined, the radiation image from any viewing location can be determined in a simple manner.

A third aspect of the invention concerns an improved system for creating a radiation image, where the system is useful for computer graphics employing ray tracing techniques. The method of the preferred embodiment is for defining the radiation data between a surface and a radiation source in an environment. The method comprises defining a polyhedron enclosing a radiation source and defining grid cells on at least one plane of the polyhedron between the radiation source and the environment and determining which grid cells are covered by the projection of any surface. Using this method, it is possible to determine, for all surfaces in the environment, whether the surfaces or any portion thereof can receive radiation from any particular radiation source or not. This information may be stored as a record list for each grid cell. Hence, when it is known which surfaces are visible from a particular observation position, whether such surfaces receive radiation from radiation sources in the environment or not can be determined in less time than conventional methods.

A fourth aspect of this invention is the use of a modified hardware image processor which performs typical scan conversion and visible surface operations, but stores the resulting data in different formats as intensity information or polygon or object identifiers, and which has a path to send data directly back to a general purpose memory device. Algorithms which simulate the effects of global illumination for both diffuse or specular environments, or the combination of diffuse and specular environments, can be reformulated to take advantage of the modified hardware implementation. Using this hardware, algorithms such as the radiosity and ray-tracing approaches can be executed at speeds several orders of magnitude faster than those previously attained, allowing high quality images to be produced very rapidly.

BRIEF DESCRIPTION OF THE DRAWINGS

FIG. 1A is a flow chart illustrating a conventional computer graphics algorithm for creating light images.

FIG. 1B is a conventional computer graphics system for implementing the algorithm of FIG. 1A.

FIG. 2 is a flow chart illustrating an aspect of the invention.

FIGS. 3A and 3B are schematic views of a viewer viewing an object in object space and image space respectively to illustrate a conventional method of perspective transformations used in computer graphics.

FIGS. 3C, 3D are schematic depth buffer and an intensity buffer respectively used in conventional computer graphics applications.

FIGS. 4A and 4B are schematic views illustrating previously known radiosity methods for determining the form factors between surfaces.

FIGS. 5A–5E are schematic views illustrating a radiosity system which is one aspect of the invention.

FIGS. 6 and 7 are flow charts illustrating the radiosity system of FIGS. 5A–5E.

FIGS. 8 and 9 are block diagrams of a radiation image system to illustrate another aspect of the invention.

FIGS. 10A, 10B are schematic views of light buffers for accelerating shadow testing in specular reflection simulation to illustrate yet another aspect of the invention.

FIG. 11 is a flow chart illustrating an algorithm for creating the light buffer of FIGS. 10A and 10B.

FIG. 12 is a schematic view of a viewer viewing a surface which reflects or transmits light from the environment to illustrate a feature of the ray tracing algorithm of the invention.

FIG. 13 is a flow chart illustrating the feature of the ray tracing algorithm of FIG. 12.

DETAILED DESCRIPTION OF THE PREFERRED EMBODIMENT

The invention is particularly useful in computer graphics for producing light images. To simplify the description and facilitate the understanding of the invention, the invention will be illustrated in its application to creating light images, with the understanding that other types of radiation images such as acoustic, thermal and radioactive may be produced in a similar manner.

FIG. 1A is a flow chart illustrating a conventional computer graphics pipeline for creating light images. Conventional graphic pipeline systems treat the creation of images by means of a computer as a sequential process employing many steps. Typically, a model of the environment is created by dividing the surfaces in the environment into polygons (Block 20). The light reflectivity and emission values for each color band are selected for each polygon.

A particular viewing location and field of view is selected. The model created for the environment is perspectively transformed from object space to image space into proper relationship with the viewing location and field of view (Block 22), in a process described below in detail to simplify the determination of surfaces visible to the viewer. The surfaces in the environment are then tested to find out which surfaces are visible from the viewing location (Block 24). Using a constant ambient term for the global illumination, the intensity I of reflected radiation from each visible surface is then calculated in accordance with the following equation (Block 26):

$$I = I_a + k_d \sum_{j=1}^{m} N \cdot L_j + k_s \sum_{j=1}^{m} (\cos c p_j)^n$$

where
  $I_a$ is the intensity due to ambient radiation,
  $k_d$ is the diffuse reflection constant,
  m is the number of radiation sources in the environment,
  N is the unit surface normal vector,
  $L_j$ is the vector in the direction of the jth radiation source,
  $k_s$ is the specular reflection coefficient,
  $p_j$ is the angle between the reflection vector of light from source j and the vector in the direction of the viewing or observation location, and c a constant, and
  n is an exponent that depends on the glossiness of the surface.

In the equation above for calculating the intensity of reflection from a surface, the first term $I_a$ is the ambient term which remains a constant for all surfaces. The second term $$k_d \sum_{j=1}^{m} N \cdot L_j$$

is the diffuse term which is the sum of the dot products of the unit normal vector of the surface with the unit vector in the direction of the jth radiation source for all j. The third term is the sum of the dot products between the unit reflection vectors of light from the jth radiation source reflecting specularly off of the surface and the unit vector in the viewing direction for all j. For a further elaboration of the conventional model intensity calculation, see "An Improved Illumination Model for Shaded Display" by Turner Whitted in *Communications of the ACM*, vol. 23, No. 6, June 1980.

The illumination calculations can be performed for each pixel, but normally are done at the polygon vertices. Scan conversion of polygons is then performed for the pixels of the image plane (Block 28). The process is as follows. Each polygon is scan-converted and its depth computed at each pixel covered. The depth of the closest polygon at each pixel is stored in a buffer frequently known as the depth buffer. The illumination values of the pixels are linearly interpolated and stored in a buffer often known as an intensity buffer; these values may then be displayed (Block 30).

Except for the creation of the model, the entire process described above must be repeated for every different image. In many computer graphic applications, it is necessary to create images of the same static environment but viewed at different locations. For such applications, the steps in Blocks 22-30 must be repeated for each frame.

FIG. 1B is a block diagram of a graphics processor pipeline suitable for implementing the conventional method of FIG. 1A. The user creates a model of the environment (Block 20 of FIG. 1A) using central processing unit or CPU 21. The perspective transformations of Block 22 are performed in the transform engine 23. The image processor 25 determines which surfaces are visible to the viewer and calculates the illumination at such surfaces (Blocks 24, 26 of FIG. 1A). The results of the illumination calculation are stored in image storage 27 and displayed by video display 29.

The image processor performs the polygon scan-conversion operation and the depth-buffer visible surface algorithms in hardware, and stores the resulting information in local memory.

Polygon scan-conversion routines are well-known and well-documented (*Fundamentals of Computer Graphics*, by J. D. Foley and A. Van Dam, Addison-Wesley Publishing Co., 1982, pp. 456-462, and *Principles of Interactive Computer Graphics*, by W. M. Newman and R. F. Sproull, McGraw Hill, 1979, pp. 232-243, pp. 286-287). The standard scan-conversion algorithm takes advantage of polygon scan-line, and pixel coherence and can easily be implemented in hardware. The most widely used method receives the polygon edges and sorts them according to their y (vertical) coordinates. For a given scan-line, some of the edges intersect the scan-line, and are termed "active" edges. The active edges are sorted in the x (horizontal) direction, and the sorted list is maintained. Segments, which are covered by the polygon, can be determined by the scan-line intersection of the neighboring active edges. Computations are simplified since edge-scan-line intersections can be easily predicted by knowing the shapes of the lines (polygon coherence). Furthermore the sorted edge list tends to remain the same from scan-line to scan-line unless new edges appear or old edges disappear (scan-line coherence). Lastly, the depth and color of the polygon at each pixel along a segment can be incrementally computed along the scan-line (pixel coherence).

The simplest visible surface routine is known as the depth buffer or z-buffer algorithm. The depth buffer stores the depth of the current visible polygon at every pixel. As a new polygon is scan-converted, the depth of this polygon is compared at every pixel covered. If the polygon is closer to the observer, the new polygon depth is stored in the depth buffer. The process continues until all polygons have been processed, and only the visible polygons remain in the depth buffer. Every time there is a replacement of a new polygon, a new intensity is computed and stored in an intensity buffer.

Because of their simplicity, both of these algorithms are easily implemented in hardware, such as in U.S. Pat. No. 4,475,104 to Shen. The hardware execution allows the conversion of polygon data to pixel data to occur at speeds far in excess of software implementation. However, there are several basic restrictions to previous hardware implementations. The scan conversion process has been limited to triangular or convex polygons, and cannot handle concave polygons or polygons with holes. Only the depth and intensity information was maintained, and it was not possible to determine what polygon was visible at a given pixel. Lastly, it was difficult, if not impossible to retrieve information after the algorithms were executed since the intensity was sent directly to the display.

By constructing a hardware image processor, which performs the scan-conversion and visible surface operations, which stores the resulting data as intensity information, or polygons or object identifiers, and which can send data back to a general purpose memory device, a new set of image generation algorithms can be executed at speeds several orders of magnitude faster than previously attained. Furthermore, the global illumination information which can rapidly be calculated using this hardware will result in the production of images of very high quality. For the purpose of understanding the invention, some of the new algorithms will be described first before the new hardware implementation.

FIG. 2 is a flow chart illustrating the invention. The method illustrated in FIG. 2 is applicable for developing images of radiation which may be light, sound, heat, radioactive emission or other radiation having similar properties. A model of the environment is created (Block 32) in a manner similar to that of block 20 of FIG. 1A, except that the surfaces into which faces of objects are divided into need not be polygons. Instead they may be smaller surfaces or surfaces elements which may or may not be planar. These surfaces or elements may be defined by points, or points together with a defining equation. The radiation data independent of the observation location is then calculated (Block 34). This invention is based on the observation that the first two terms of the reflected radiation intensity equation above are independent of the observation location and need not be repeated for developing subsequent images of the same static environment. Furthermore, the values of $(\cos c p_j)^n$ may be precomputed for a large number of values of $p_j$ and stored in a look-up table. These steps are performed in calculating the radiation data independent of viewing location in Block 34.

Next, a viewing position is selected, and a perspective transformation from object space to image space is performed (Block 36). The value of $p_j$ for the jth radiation source is determined, and the value of $(\cos cp_j)^n$ obtained from the look-up table compiled during the view-independent calculations in Block 34. The third term of the radiation intensity equation above for reflected radiation may be calculated (Block 37). The surfaces in the environment observable from the viewing position are determined (Block 38). Then the intensities at the pixels can be computed or the polygons can be scan-converted as before (Block 40). Pixel intensities are then displayed (circle 42).

In the method of FIG. 2, in creating the first image, all the steps above should be performed. In order to create subsequent new images, however, all one has to do is to repeat the steps in Blocks 36–42. The view independent radiation data calculations may require a significant portion of the time needed to develop the first image. In creating subsequent images using the method of FIG. 2, such time can be saved. The method illustrated in FIG. 2 is therefore advantageous over that of FIG. 1A in that, where a number of images from different viewing positions of the same environment is desired, the images after the first may be developed much faster than the method of FIG. 1A.

In the above description, the method of FIG. 2 is illustrated in the applications where no intersurface reflections or shadows are taken into account. It will be understood, however, that the method of FIG. 2 may also be applied to radiosity and ray-tracing methods where such events are accounted for as discussed in detail below to accelerate the process of creating a number of images of the same static environment.

Before describing the invention in more detail, the perspective transformations referred to in Block 22 of FIG. 1A in the conventional method is described below in reference to FIGS. 3A, 3B, 3C and 3D as background to the invention. In reference to Block 22, perspective transformation is performed on the objects in the environment relative to an observer in the relative position shown in FIG. 3A. As shown in FIG. 3A, the observer is at position 50 with a field of view defined by planes 52. The image plane is at 54. An arbitrary ray 56 through a pixel at position 58 in the image plane may pass through points A and B of object 60. As is evident from FIG. 3A point B is blocked by the front face of object 60 so that it is not visible at position 50. Determining the intersection point between an arbitrary ray and an arbitrarily oriented surface is time consuming. For this purpose the determination can be simplified by transforming the environment from real object space into what is called an image space, where the viewer views the environment from very far away (infinity) so that all the rays through the pixels of the image plane are essentially parallel to one another as shown in FIG. 3B. As shown in FIG. 3B, the viewer is at location 50' with a field of view defined by parallel planes 52', the image plane at 54', the arbitrary ray at 56' passing through point 58' of the image plane and intersecting points A' and B' of object 60' in the image space.

Operating in the image space, it is relatively simple to mathematically determine that the point B' is not visible at position 50'. This is due to the fact that the light rays traveling from object 60 to a viewer at position 50' are parallel. If the image plane 54' is taken as the X, Y plane with the distance of objects from the plane measured as Z, whether any point with coordinate (X', Y', Z') is visible at position 50' can be determined simply by comparing the Z coordinates of points with the same X and Y coordinates. Thus, points A' and B' have the same X and Y coordinates but point A' has a smaller value for its Z coordinate than point B'. Therefore, point B' is not visible at position 50'. If the Z distance from plane 54' is called the depth value, then which of two points having the same X and Y coordinates are visible can be determined by comparing their depth values.

The image plane may be divided into pixels of a desired resolution. The depth and intensity buffers may store the points of surfaces visible to a viewer and their light intensities on a pixel by pixel basis as shown in FIGS. 3C, 3D. Each surface is scan-converted to determine which pixels are covered by the surface. Then the depth of the surface are stored as shown in FIG. 3C. The visible surface determination process in Block 24 of FIG. 1A is then completed when all polygons have been processed.

After the light intensities at different bandwidths (typically the red, green and blue channels) of the visible surfaces are calculated, they are stored on a pixel by pixel basis in an intensity buffer frequently known as a frame buffer as shown in FIG. 3D. The illumination calculation referred to in Block 26 of FIG. 1A is then completed. The pixels of the image plane 54' may then be displayed.

HEMI-CUBE

Before the system of the invention for radiosity determination is described, it will be helpful to first discuss the method disclosed in the paper "Modeling the Interaction of Light Between Diffuse Surfaces," by Cindy M. Goral et al., *ACM Computer Graphics (Proceedings 1984)*, pp. 213–222. In the few paragraphs that follow, the radiosity method as disclosed by Goral et al. is summarized.

Radiosity is the total rate of energy leaving a surface which, in the case of a light source, may both emit ad reflect light. In the case of a passive surface, the surface may simply reflect and not emit light. Therefore, when the energy concerned is light, radiosity is the sum of the reflected light from a given surface plus the light emitted directly from the surface. The computation of the radiosity requires a complete specification of the geometric relationships among all reflecting and transmitting surfaces, as well as the light leaving every other surface. Thus, for a receiving surface i, this relationship is given by:

$$B_i = E_i + \rho_i \sum_{j=1}^{N} B_j F_{ij}$$

where
  $B_i$ is radiosity of or the total rate of energy per unit area (light) leaving surface i,
  $E_i$ is the rate of energy per unit area (light) emitted from surface i,
  $P_i$ is the fraction of incident light which is reflected back into the environment by surface i,
  $F_{ij}$ is the fraction of the energy leaving surface i which lands on surface j, N is the total number of surfaces in the environment, and
  $B_j$ is the total rate of energy per unit area (light) leaving surface j.

In the equation above, it is assumed that the environment may be subdivided into small discrete surface elements each of which has a constant radiosity. Thus, if there are a total of N surfaces in the environment, the set of simultaneous equations of the form factors are as follows:

$$\begin{bmatrix} 1 - \rho_1 F_{11} & -\rho_1 F_{12} & \cdots & -\rho_1 F_{1N} \\ -\rho_2 F_{21} & 1 - \rho_2 F_{2N} & \cdots & -\rho_2 F_{2N} \\ \vdots & \vdots & & \vdots \\ -\rho_N F_{N1} & -\rho_N F_{N2} & \cdots & 1 - \rho_N F_{NN} \end{bmatrix} \begin{bmatrix} B_1 \\ B_2 \\ \vdots \\ B_N \end{bmatrix} = \begin{bmatrix} E_1 \\ E_2 \\ \vdots \\ E_N \end{bmatrix}$$

The color of an object is determined by the total sum of its reflectivity (or emission in the case of a light source) at each wavelength of the visible spectrum. The reflectivity and emission terms in the above equations are, therefore, valid for a particular wavelength or band of wavelengths. It is necessary to form and solve the above matrix for each band of interest in order to determine the full radiosity of each surface element. It is important to note that the form-factors are solely a function of geometry and are thus independent of any color considerations.

A conventional method for deriving the form factors are illustrated in reference to FIGS. 4A, 4B. If two differential surface elements $dA_i$, $dA_j$ are not occluded by a third surface, the form factor for radiation emitted by differential element $dA_j$ landing on $dA_i$ is given by:

$$F_{dAidAj} = \frac{\cos\phi_i \cos\phi_j}{\pi r^2} \cdot dA_j$$

The form factor between the two finite surface elements is defined as the area average and is thus:

$$F_{AiAj} = \frac{1}{A_i} \int_{A_i} \int_{A_j} \frac{\cos\phi_i \cos\phi_j}{\pi r^2} dA_j dA_i$$

Siegel et al., in *Thermal Radiation Heat Transfer*, discussed a method developed by Nusselt; the method uses a geometric analog for the form-factor integral above to obtain form factors by both photography and planimetry. As shown in FIG. 4B for a finite area, the form factor is equivalent to the fraction of the circular area of the base of the hemisphere covered by projecting the surface $A_j$ onto the hemisphere and then orthographically down onto the base.

If the distance between the two surface elements is large compared to their size, the form factor from element to element is approximated by using the center point of element i to represent the average position of element i. Each element has as its "view" of the environment, the hemisphere surrounding its normal, as shown in FIG. 4B.

The above solution proposed by Nusselt, however, does not lend itself to easy computational solutions for the form factor. This invention is based on the recognition that, when any two surface elements in the environment are projected onto the hemisphere of FIG. 4B, they occupy the same area and location, and will have the same form factor value relative to surface element i. Therefore, as shown in FIG. 5A, surface elements A, B, C, D and E all have the same form factor relative to the surface element whose view is the hemisphere of FIG. 5A. The invention is based on the further observation that the calculation of the form factor can be simplified by using a hemi-polyhedron instead of a hemisphere. A hemi-polyhedron that really simplifies the calculation is that of a hemi-cube.

Therefore, instead of using a hemisphere, an imaginary hemi-cube is constructed around the center of the receiving surface element as shown in FIGS. 5B, 5C which illustrate the preferred embodiment of the invention. The environment is transformed to set the element's center at the origin with the element normal coinciding with the Z axis, as shown in FIG. 5B. In this orientation, the hemisphere employed by Nusselt is replaced by the hemi-cube with a base on the X—Y plane whose center coincides with the center of the surface element. The faces of the hemi-cube above the base are divided into grid cells at a given resolution. For easy scanning, these grid cells are preferably rectangles or squares. The form factor between element Aj and Ai can be determined simply by projecting the element Aj onto the faces of the hemi-cube as shown in FIG. 5B, and adding the contributions to the form factor of all the grid cells within the projected image on the faces of the hemi-cube.

In a similar manner all the surfaces in the environment may be projected onto the five faces of the hemi-cube.

The contribution of each grid cell on a face of the hemi-cube to the form factor value varies and is dependent on it location and orientation. The contribution of a grid cell may be called a delta form factor. The delta form factor contributed by a grid cell on the top face of the hemi-cube is calculated as follows in reference to FIG. 5D.

$$r = \sqrt{X^2 + Y^2 + 1}$$

$$\cos\phi_i = \cos\phi_j$$

$$\cos\phi = \frac{1}{\sqrt{X^2 + Y^2 + 1}}$$

$$\Delta\text{Form-factor} = \frac{\cos\phi_i \cos\phi_j}{\pi r^2} \Delta A$$

$$= \frac{1}{\pi(X^2 + Y^2 + 1)^2} \Delta A$$

In the equations above, the resolution of the hemi-cube is chosen to be such that the center point of a grid cell may be used to represent the average position of the cell. The delta form factor contributed by a grid cell on a side surface of the hemi-cube may be calculated as follows and is illustrated in reference to FIG. 5E:

$$r = \sqrt{Y^2 + Z^2 + 1}$$

$$\cos\phi_i = \frac{Z}{\sqrt{Y^2 + Z^2 + 1}}$$

$$\cos\phi_j = \frac{1}{\sqrt{Y^2 + Z^2 + 1}}$$

$$\Delta\text{Form-factor} = \frac{\cos\phi_i \cos\phi_j}{\pi r^2} \Delta A$$

$$= \frac{Z}{\pi(Y^2 + Z^2 + 1)^2} \Delta A$$

The choice of a hemi-polyhedron in the shape of a hemi-cube is advantageous since the calculations of the delta form factors are greatly simplified as shown in the equations above. Furthermore, taking advantage of the symmetry of the cube, one needs to calculate the delta form factors for only one-eighth of the top face and one-quarter of one side face. In reference to FIG. 5B, the form factor between the surface elements $A_i$ and $A_j$ is given by the sum of the delta form factors of the grid cells within the projected image of the element $A_j$ onto the hemi-cube.

FIG. 6 is a flow chart of a radiosity method for creating a visual image of an environment to illustrate the preferred embodiment of one aspect of the invention. A comparison of FIGS. 2 and 6 will reveal that FIG. 6 is a more detailed implementation of the method of FIG. 2 where the radiation image to be developed is of an environment with diffuse surfaces. Therefore, the steps that are identical in the two figures are labeled by the same numbers. In the radiosity method, however, all the radiation data calculated is view-independent, so that no view dependent calculations (Block 37 of FIG. 2) are necessary.

A model of the environment is created (Block 32) and the radiation data (Block 34 of FIG. 2) is calculated in two steps in FIG. 6 (Block 34', 34''). The form factors for all surface elements in the environment are calculated (Block 34') so that the simultaneous matrix equations for the radiosities of the surface elements may be calculated (Block 34''). The solution of the equations will be explained in more detail below.

Once the radiosities of all the surfaces in the environment are known, the illumination calculations are complete and the following steps of perspective transformations, visible surface determination, rendering and display (Blocks 36–42) may be performed in a manner similar to those described above in reference to Blocks 22, 24, 28 and 30 of FIG. 1. When a second image taken at a different observer location is desired, the form factor calculations and the surface radiosity calculations need not be repeated. All that needs to be repeated are the steps of Blocks 36–42, thereby greatly accelerating the process for developing the second and other subsequent images of the same static environment.

Where the objects remain static but where the objects are illuminated by different colors or different lighting, the method of FIG. 6 also allows these different images to be developed at a much faster rate than previous methods. Since the form factors do not change with the change in colors or lighting, the form factor calculations do not need to be repeated, although the surface radiosity calculations must be repeated since the emission terms in the matrix equations may now be different. With modifications, these techniques may also be applied to dynamic environments. Since the form factor calculations are usually the most time consuming of all the steps in the process, the method of FIG. 6 has significant advantages over previous methods.

The form factor calculation performed in Block 34' of FIG. 6 is illustrated in more detail in FIG. 7. First, the hemi-cube resolution is defined by defining the number of grid cells in each of two directions per face in reference to FIG. 5B (Block 100). The delta form factors are then computed for each grid cell; the delta form factors are then stored in a look-up table (Block 102).

A surface element i is selected, and the center of the base of the hemi-cube is placed at a selector point of the element i, where the point of the element is selected so that it may be used to represent the average position of the element. Typically, this is the center of the element (Block 104), but it may also be placed at the element vertex.

The environment is then geometrically transformed so that the hemi-cube is at the origin with the proper orientation as described above (Block 106). The environment is clipped to the frustum of vision defined by one hemi-cube face in a conventional manner (Block 108). One conventional clipping method is described in U.S. Pat. No. 3,816,726 to Sutherland et al. The environment is perspectively transformed from object space to image space in a manner similar to that described above in reference to FIGS. 3A, 3B (Block 110). Scan conversion and visible surface determination are then performed to find out which surfaces or portions thereof are closest (i.e. visible) to the center of the cube at each grid cell of the face of the hemi-cube (Block 112) using standard techniques such as a depth buffer as illustrated in FIG. 3C. Instead of storing the intensity values of the surface elements, the identity of the closest surface at each grid cell of the face is stored (FIG. 3D, Block 114).

One then checks to see if, out of the five hemi-cube faces, whether there is another face which should undergo the clipping operation (Diamond 116). Thus, if there is another face to be clipped, the steps in blocks 106–114 are repeated for such face with the result that the identity of the closest surface at each grid cell for all five faces of the hemi-cube are now stored. All the grid cells covered by one surface element j are then fetched from memory and the delta form factors for such grid cells are then added together (Block 118). The sum is the form factor $F_{ij}$. This process is repeated for all surfaces in the environment to obtain all the form factors to define the fractions of the light received by all other surface elements in the environment of the light leaving surface element i (Block 118). One then checks to see if there is another element in the environment for which form factors should be calculated (Diamond 120). If there is, then the steps in Blocks 104–114, Diamond 116 and Block 118 are repeated for such receiving element. In such manner all the form factors are calculated.

After all the form factors have been calculated, the matrix equation relating the reflectivities, radiosities and emissions of all the surface elements in the environment is now ready to be solved. The matrix equation may be solved with any standard equation solver. An iterative approach may be advantageous since it speeds up the process for solving the equations. Thus, an initial guess for the radiosities, which must be supplied for the first iteration, is simply the emission of each element (only the primary light sources have any initial radiosities). During each iteration each radiosity is solved for using the previously found values of the other radiosities. Iterations continue until no radiosity value changes by more than a preselected small percentage. The iterative process converges rapidly, and a solution may be found in a fraction of the time needed for standard elimination techniques.

FIG. 8 is a block diagram of a graphics pipeline which may be used to implement the method of FIGS. 6 and 7. The model creation (Block 32 of FIG. 6) is performed in the CPU 150. In reference to FIGS. 7 and 8, the definition of the hemi-cube resolution and the delta form factor computations (Blocks 100, 102) are input to the CPU and stored in the CPU memory.

The CPU 150 provides information on the hemi-cube resolution, the delta form factors and other information on the model created to the floating point accelerator 152 and the next several steps in the flow chart of FIG. 7 are performed in the floating point accelerator. In the accelerator, a surface element i is selected and the center of the base of the hemi-cube is placed at a selective point of the element. The environment is geometrically transformed so that the hemi-cube is at the origin with the proper orientation. The environment is then clipped to the frustum defined by one hemi-cube face. The environment is then perspectively transformed. See Blocks 104–110 of FIG. 7. All these steps are performed by the floating point accelerator 152. The accelerator then provides the result of its operation to image processor 154 and the image processor performs the scan conversation and visible surface determination of Block 112 of FIG. 7.

The structure of the image processor is illustrated in more detail in FIG. 9. In reference to FIG. 9, a surface element edge sorter 156 sorts the surface elements in the environment by one of their coordinates, such as the Y coordinates. The active edge sorter 158 sorts in another direction, such as X, and then keeps track of which particular edges may be processed by the image processor at any one time. An increment calculator 160 then calculates the edge increments in the remaining coordinate directions, such as the X and Z directions at the intermediate points between vertices. The scan converter 170 and the depth comparison processor 172 then compute and compare the locations of the interpolated points on the surface element to previous values stored for other surface elements at the same X and Y locations to determine which particular surface element is visible to the hemi-cube center. The identity of the closest surface (Block 114 in FIG. 7) is then stored in a temporary storage in control store 174 and sent to a general purpose memory device, which may be a part of the CPU.

Where the memory in store 174 is of sufficient size to store the results for projecting the environment onto all five faces of the hemi-cube, the graphics pipeline of FIG. 8 simply returns to the floating point accelerator 152 for projecting the environment onto a different face of the hemi-cube and the process is repeated. The identity of the closest surfaces is again stored in the store 174. After the projection of the environment onto all five faces of the hemi-cube has been completed, the identities of the closest surface elements to the grid cells on the five faces of the hemi-cube are then sent to the CPU memory.

The CPU then performs the step in Block 118 of FIG. 7 by finding all the grid cells covered by a particular surface element and adds the delta form factors to obtain the form factor between such surface element and the surface element at the center of the hemi-cube. This is repeated for all the surface elements. The CPU then checks to see if there is another element in the environment for which the row of form factors in the form factor matrix equation must be calculated (Diamond 120 in FIG. 7). If there is then the above process is repeated using CPU 150, floating point accelerator 152 and image processor 154. If there is none, the form factor calculation of Block 34' of FIG. 6 has been completed.

In reference to FIG. 6, the graphics pipeline of FIG. 8 is then ready to perform the remaining steps of FIG. 6. The CPU and the floating point accelerator perform the surface radiosity calculations of Block 34" by solving the matrix equation. The floating point accelerator 152 performs the perspective transformations of Block 36 and the image processor 154 performs the visible surface determination of Block 38. Since the radiosities of the different surface elements in the environment are known, once the surfaces visible at a particular observer position are determined, their radiosities can be fetched from the CPU memory and scan converted in the image processor by scan converter 170 to give the light intensities of the pixels in the image plane. Such information is then sent to image storage 182 and displayed by video display 184.

A comparison of FIGS. 1B and 8 will reveal that the graphic pipeline of the preferred embodiment of the invention differs from the conventional pipeline in that the precomputed radiation data may be stored in the memory, such as the CPU memory, through a feedback path 186 as shown in FIG. 8; such path is not present in the conventional pipeline of FIG. 1B. Having this feedback path allows the precomputed radiation data to be stored in a memory. Such data is then fetched at a later time for accelerating the illumination calculations. Where the graphics pipeline of FIG. 8 is used to perform the radiosity calculations as described above, all the form factors of Block 34' may be precalculated and stored in the CPU memory. Where the color or lighting of the static environment does not change, the result of the surface radiosity calculations of Block 34" may also be stored in the CPU memory via the same feedback path. In such manner the most time consuming portions of the radiosity calculations have been precomputed so that a number of images of the same environment may be created quickly. Furthermore, conventional hardware exists for performing the scan conversion process described above. The invention is also based on the observation that where the grid cells on the hemi-polyhedron consists of ordered arrays of grid cells of the same shape, the existing conventional hardware for a scan conversion may be adopted in the image processor of FIG. 9 for the calculation of form factors. Since the grid cells are essentially identical, they may be treated in a manner similar to the polygons scanned by a conventional scan converter. Preferably the grid cells on the hemi-polyhedron are regular in shape and are preferably rectangles, triangles or squares.

Light Buffer

In ray tracing, it is necessary to test whether a surface visible to the viewer is illuminated or in shadow with respect to a particular light source. Shadow testing is time consuming and accounts for a significant part of the processing time in creating computer images by ray tracing techniques. One aspect of the invention is based on the observation that a point can be determined to be in shadow without having to find out which object first occludes it. In addition, shadow testing can be accomplished by referencing surfaces to the direction of light rays in a conceptual device referred to below as a "light buffer". An idealized light buffer can thus be defined as having two algorithms:

1. A procedure to partition the environment with respect to each light's position.
2. A procedure to test if a given point is in shadow by using this partitioned definition of the environment.

Again a model of the environment is created and the surfaces in the environment are defined. In order to reference data by using the direction of light rays originating from a particular light source, a light buffer is constructed. The light buffer may be a polyhedron enclosing the light source. In the preferred embodiment, the polyhedron is a cube.

FIGS. 10A and 10B are simplified perspective views of light buffers with objects in the environment and list records for a particular grid cell of the light buffer to illustrate the preferred embodiment of the invention. As shown in FIG. 10A, a light buffer 204 is defined to enclose light source 202. It is preferable to place the center of the light buffer 204 at the center of the light source. Using the light buffer 204, the environment may be partitioned with respect to light source 202. This procedure allows the subsequent shadow testing procedure with respect to light source 202 to be accelerated compared to conventional methods.

The procedure for creating the light buffer 204 for light sources 202 will now be described in reference to FIGS. 10A, 10B and 11. While the description below will be in reference to light images and optical reflections, it will be understood that the same system is applicable to the creation of other types of radiation images; all such configurations are within the scope of the invention. While light buffer 204 of FIGS. 10A, 10B respectively are described herein as cubes with their respective centers at the centers of the light sources 202, it will be understood, however, that polyhedra other than cubes may be used for the light buffer and the light buffer polyhedron may be placed with its center away from the light source center and the invention described herein will function in essentially the same manner.

The partitioning of the environment with respect to light source 202 using buffer 204 will now be described in reference to the flow chart of FIG. 11. The light buffer resolution is defined by specifying the number of grid cells in each of two orthogonal directions of the light buffer face (Block 222). The center of the cube is placed at the center of light source 202 (Block 224). The environment is geometrically transformed so that the light buffer is at the origin with the proper orientation (Block 226). The environment is clipped to the frustum of vision defined by one light buffer face, such as face 206 facing object number 7 (Block 228). The environment is then perspectively transformed from object space to image space and scan conversion is performed to find which grid cells on face 206 are covered by a selected projected surface such as face 3 of the object 7 (Blocks 230, 232).

For each grid cell which is covered by the image of the projected surface (such as cell 208), the surface is inserted into the grid cell's record list. The identity of all surfaces and their distances or relative distances from source 202, herein called depth values, are stored in the list. FIG. 10A contains a grid cell list for cell 208 for illustration. As shown in the list, face 3 of object 7 is identified and stored in a list together with its depth value from the source. One then checks to see if there is another surface in the environment which should be projected onto face 206 in the frustum of vision defined in Block 228 (Diamond 236). If there is, then the steps in Blocks 232 and 234 are repeated to add the surface to the list records of the grid cells covered by the projected image of such surface. If all the surfaces within the frustum of vision for face 206 have been projected, one proceeds to check whether there is another light buffer face for which the view transformation and clipping operation of Blocks 226, 228 have not yet been performed (Diamond 238). If there is, the environment is geometrically transformed so that the Z axes passes through such face. The steps in Blocks 228–234 and Diamond 236 are then performed to compile the list records of all the grid cells covered by projected images of surfaces onto such face. When the above-described process has been completed for all six faces of the light buffer 204, one checks to see if there is another light source for which light buffers should be created (Diamond 240). If there is, then the above-described steps in Blocks 224–234 and Diamonds 236, 238 are repeated to compile the list records of the grid cells of the light buffer for such source. In this manner the environment has been partitioned with respect to every light source present.

The identity of the surfaces and their depth values may be stored in the list records in such manner that their subsequent use in shadow testing is facilitated. This is illustrated in reference to FIG. 10B. FIG. 10B is a simplified perspective view of a light buffer and certain objects in the environment to illustrate such simplifying techniques. Buffer 204 has on one of its faces grid cell 252. Portions of objects 1–4 lie within the frustum 254 of vision defined by cell 252. The list record of cell 252 after the process described in FIG. 11 is shown as record I in FIG. 10B. Where an object has complex shape, a conventional method for testing whether such object is intersected by a light ray is to simplify the task by substituting the object with a bounding volume enclosing the object in the ray tracing test. Thus, as shown in FIG. 10B, object 2 is enclosed within a bounding volume. To flag the presence of a bounding volume, a negative identifier ($-2$) with a face identified as (0) is inserted into record II.

It will be noted that object 3 fully occludes the frustum 254 so that object 4 will be entirely in shadow. The detection of this condition can be used to greatly simplify the list of record and the subsequent shadow process. Thus, if it is detected that a surface element visible to the viewer is at a distance further away from the light source than object 3, such surface element will be in shadow and no further testing of occlusion will be needed. For this reason the identities and depth values of all surfaces beyond object number 3 may be deleted to prune the list. Preferably the entries in a list records are arranged in an ascending order of depth values as shown in records I, II and III. The record of object 3 which occludes the entire frustum 254 is known as a full occlusion record and is identified by a negative identifier for its Z depth and is listed as the last record in the list record as illustrated in record III in FIG. 10B. Thus, a convenient procedure for checking to see if a visible surface is completely occluded is to check the last entry of the list record. If the last entry is a full occlusion record at a smaller depth value than the visible surface element, then the visible surface element will be occluded.

The manner in which the image processor hardware, with its ability to create and store item buffers and light buffers, and how it can be used to accelerate ray-tracing, is illustrated below in reference to FIGS. 12 and 13. In some light environments, the light observed from a particular surface may originate from other surfaces which are reflected from or transmitted through the surface viewed. FIGS. 12 and 13 also illustrate a system for determining the contributions of light originating from other surfaces observed at the viewed surface.

FIG. 12 is a schematic view of an observer observing radiation such as light from a surface originating from a number of light sources or surfaces to illustrate the preferred embodiment of the invention. As shown in FIG. 12, the viewer 300 views a surface S1 in the environment at a picture plane 302. Rays V1-V4 are representative light rays from surface S1 reaching the eye 300 through the picture plane 302. Thus, the light intensity observed by the eye is the light intensities of rays such as the representative rays V1-V4. Rays V1-V4 may comprise light reflected off surface S1 directly from light sources, light reflected off surface S1 from other surfaces such as surface S2 and light transmitted through surface S1 from other surfaces such as surface S3. Therefore, to create a realistic image, the contributions of light R1-R4, T1-T4 originating from surfaces S2, S3 respectively are added to the intensities of the directly reflected rays V1-V4.

FIG. 13 is a flow chart illustrating the steps for computing the contributions to the light intensity observed by the eye from a surface which originate directly from other light sources or indirectly from other surfaces in the environment. As shown in FIG. 13, a model of the environment is again created in a manner described above (Block 32). A light buffer is created for each light source in the environment in the manner discussed above in reference to FIG. 11 (Block 360). The environment is then transformed so that its reference system is consistent with that of the observer at position 300 in FIG. 12 (Block 362). Using the image processor hardware, a scan-conversion algorithm is applied to determine the surfaces which are visible to the observer in the manner described above. The visible surfaces or portions thereof are then stored in an item buffer (Block 364).

Each surface in the environment is tested to see if it is partially specular (Block 366, Diamond 368). One simple manner for testing specularity is to determine whether the specular reflection coefficient of the surface is zero or not. If the coefficient is zero, then the surface is non-specular; if the coefficient is non-zero, the surface is specular or partially specular. If the surface is specular or partially specular, the following steps are then performed. First, the pixels on the image plane covered by the surface are retrieved from the item buffer (Block 370). The exact intersection locations on the surface by rays from the eye passing through each of the covered pixels are computed and saved (Block 372). A predetermined point in each pixel may be selected for tracing the ray. Thus a ray may pass from the eye to one particular corner of a pixel. The intersection point is then found by finding the intersection between the ray and the surface. The intersection locations are tested to see if they are in shadow in reference to the light sources in the environment using the light buffers created (Block 374). The ambient and diffuse components of intensity as well as the specular component of intensity contributed by direct illumination from light sources may now be calculated according to the reflected intensity equation set forth in reference to Block 26 of FIG. 1 (Block 376). The results are stored in the frame buffer (Block 378). At this point only the contribution caused by direct illumination of surface S1 of FIG. 12 to the specular intensity component has been calculated. The contributions to the specular intensity components by other surfaces such as surfaces S2, S3 of FIG. 12 have not been included. This invention is based on the observation that these further contributions can be determined simply by using the steps below. If such contributions are negligible, the system may simply proceed to diamond 414 to repeat the above process for more surfaces.

In reference to FIG. 12, the contributions to the specular component caused by light reflected by surface S1 can be determined by constructing a mirage focal point 304 which is simply the mirror image of the viewer position 300 across surface S1 and a mirage picture plane 310 across S1; as shown in FIG. 12, these are simply mirror images of position 300 and picture plane 302 across S1. The mirror images of the pixels in plane 302 define the mirage pixels in plane 310. Then the surfaces in the environment which contribute light rays such as representative rays R1-R4 which are reflected by surface S1 towards the eye can be determined in a simple manner. Thus, first the mirage point 304 and the mirage picture plane 310 is determined (Block 380 in FIG. 13). A bounding box enclosing the ray intersection locations is constructed on the mirage picture image plane 310 of the mirage focal point system (Block 382). Clipping is performed to the bounding box and a scan-conversion algorithm is applied to determine the surfaces visible at the mirage point. These surfaces potentially reflect light towards the surface S1, which in turn reflect these rays towards the eye. The identity of these surfaces are stored in an item buffer for the mirage point (Block 384).

The exact intersection points of the reflected rays (R1-R4 of FIG. 12) must then be determined (Block 386). Since the mirage pixels in the mirage picture plane are mirror images of the pixels in plane 302, and since the item buffer stores the surfaces seen through each mirage pixel within the bounding box, the task of finding the exact intersection locations of the reflected rays is greatly simplified. Furthermore, multiple intersections for all rays striking the same polygon, such as rays R1-R4, can be computed at the same time.

The intersection points (such as points 306 on surface S2 of FIG. 12) are then tested to see if they are in shadow relative to the light sources in the environment (Block 388). The testing is done using the light buffers previously created. The indirect specular components contributed by light originating from such ray intersection points (such as point 306) are then computed (Block 390). The indirect specular components of the intensity seen at position 300 from surface S1 contributed by light reflected off of S1 from surface S2 may then be computed in accordance with the following equation:

$$I_{reflected\ specular} = k_s \left( k_d \sum_{j=1}^{m} N \cdot L_j + k_s \sum_{j=1}^{m} \cos c p_j \right),$$

where the quantities in the equation are defined above in the reflected intensity equation discussed in reference to Block 26 of FIG. 1.

It is noted that the ambient term $I_a$ in the reflected intensity equation should not be counted twice. For the intersection points such as points 306 which are illuminated by light sources, the specular components contributed by reflections off of S1 is then computed as indicated above. These contributions are added to the stored values in the frame buffer and the new totals are then stored in the buffer instead (391). This completes the process for adding the contributions of reflections from surface S2.

If the surface S1 is not specular, then the ambient and diffuse components of intensity must be calculated.

First, using the item buffer, the exact ray intersection points for each ray covered by the surface must be found (Block 392). Next, shadow testing using the light buffers is done (Block 393). The ambient and diffuse intensity components are then computed (Block 394) and stored in a frame buffer (Block 395).

If surface S1 of FIG. 12 is transparent, light originating from light sources or surfaces such as surface S3 may be transmitted through surface S1 and seen at the eye 300. To enable realistic images to be created for environments including transparent surfaces, the following steps may be employed.

First the surface is tested to determine if it is transparent (Diamond 396). If it is, then the viewing point is simply set at position 300 of FIG. 12. Since the transformation has already been performed in block 362, no further transformation is needed. The identities of the surfaces stored in the item buffer (performed in Block 364) are retrieved (Block 400).

A bounding box on the image plane (such as picture plane 302 in FIG. 12) is constructed (Block 402). The bounding box is then used as the clipping boundary so that only a small number of pixels of the image plane need to be evaluated. Surface S1 is then removed from the environment (Block 406) and the identities of the closest surfaces seen by the eye and within the bounding box are then recomputed. Using the item buffer, the exact ray intersection points of each ray by surfaces after surface S1 has been removed are then computed in object space and shadow testing is performed to determine which of these points are illuminated (Blocks 408–412). As an approximation it is assumed that transparent surfaces such as surface S1 have zero thickness. Thus, the transmitted ray will strike another object or surface in the environment instead of the back surface of a transparent plate which has surface S1 as its front surface. Furthermore, refraction need not be accounted for. The transmitted specular components may be computed in accordance with the following equation:

$$I_{transmitted\ specular} = k_t \left( k_d \sum_{j=1}^{m} N \cdot L_j + k_s \sum_{j=1}^{m} (\cos cp_j)^n \right)$$

where the quantities in the equation are defined in the reflected intensity equation defined above in reference to Block 26 of FIG. 1. The transmitted specular contribution to the intensity observed at eye 300 is then added to the values stored in the frame buffer; this enables very realistic images to be created.

The system then checks to see if there are more surfaces in the environment to be tested and repeats the above process where necessary. If not, the process of FIG. 13 has been completed.

In the above process of FIG. 13, the intersection points such as points 306, 308 of FIG. 12 should be found so that the indirect specular components contributing to the intensities of the rays V1–V4 viewed can be determined. Instead of having to trace the rays to find their intersections with surfaces in the environment as done in previously known methods, the method of FIG. 13 makes use of object coherence and "polygon" coherence to simplify the process and reduce processing time.

Once the intersection points in object space have been found, such as points 306, 308, the intensities of light reflected from such surfaces towards surface S1 must be calculated. Since a polygon may typically contain 100 to 900 pixels, the testing time is greatly reduced. That is, all of the intersections for a given polygon may be found using the same transformation, and entirely eliminating the sorting procedure for individual rays.

The implementation of the methods of FIGS. 10A, 10B, 11–13 using the graphic pipeline of FIGS. 8 and 9 will now be described. In reference to FIG. 11, steps in Blocks 222, 224 are performed in the CPU 150. The steps in Blocks 228, 230 are performed by the floating point accelerator 152. The scan conversion in Block 232 occurs in the image processor 154 and the compilation of the grid cell list records in Block 234 is maintained in computer memory, such as the memory of CPU 150. The scan conversion in Block 232 to define the grid cells covered by projected surface images is performed essentially in the same manner as that of Block 112 of FIG. 7 described above. The surface identifier and depth information in the list records for the grid cells covered are stored in the control store 174 and sent to the CPU memory at an appropriate time. Thus, when the process of FIG. 11 is completed, the CPU memory stores the list records for the grid cells for all the light buffers created. The radiation data so calculated may then be used to accelerate shadow testing.

In reference to FIG. 13, the model of the environment is created (Block 32) in the CPU 150. Light buffers are created as described above by means of CPU 150 and image processor 154 (Block 360). The list records of the grid cells in the light buffers are stored in the CPU memory. The environment is transformed in Block 362 in the floating point accelerator 152. The image processor 154 performs the scan-conversion of Block 364. The surfaces closest to the eye forming the item buffers are stored in the CPU memory 150 through a feedback path 186. The CPU performs the steps in Diamond 368 and Block 370. Floating point accelerator 152 computes and saves the exact intersection locations in Block 372 and the CPU performs the shadow testing in Block 374. The floating point accelerator calculates the ambient, direct diffuse, and direct specular components of the intensity in object space in Block 376. These components are then stored in the frame buffer 182 (Block 378). The mirage point and mirage picture plane and a bounding box are determined by the CPU (Blocks 380, 382). The CPU, floating point accelerator and image processor together perform the step in Block 384 and store in the CPU memory the item buffer for the mirage point. Floating point accelerator 152 finds the exact ray intersection points for each pixel covered by the surface in Block 386. The CPU performs shadow testing on the intersection points using the light buffer for Block 388 and the accelerator 152 computes the specular components in reference to Block 390. The specular components of light reflected from S1 originating from S2 in reference to Block 391 are then added to the frame buffer 182.

Where the surface is not specular, the CPU retrieves the pixels from the item buffer and the floating point accelerator finds the intersection points for the pixels covered by the surface. CPU 150 performs shadow testing in Block 393. The floating point accelerator 152 performs the step in Block 394. Image storage 182 again stores the ambient and direct diffuse components to the frame buffer.

Where the surface is transparent, the CPU 150 performs the steps in Blocks 400–406. The CPU in conjunction with accelerator 152 and image processor 154 recomputes the item buffer within the bounding box in Block 408 and the item buffer is stored in control store 174 of the image processor. Accelerator 152 computes the exact illuminated ray intersection points in Block 410. These points are shadow tested by CPU and the intensity calculations are performed in accelerator 152. The transmitted specular component is then added to the image storage 182.

As illustrated in the description above, the feedback path 186 of FIG. 8 allows the precomputed radiation data, in this case the light buffer information, to be stored in the CPU memory. Such data is then fetched at a later time (such as shown in the steps in Blocks 374, 388 and 412). The local storage such as the control store 174 in the image processor also enables a limited amount of radiation data to be stored such as the item buffer information in reference to Blocks 364, 384 and 408. In other words, the local memory in the image processor allows the limited amount of radiation data to be stored for the purpose of speeding up the particular calculations involved at the time. The light buffer information is instead stored in the CPU memory. The light buffers may require considerable storage space and are therefore preferably stored in the CPU memory instead of a local memory such as that in the image processor. Furthermore, since shadow testing is performed by the CPU, the light buffer information is most conveniently fetched from the CPU memory. Alternatively, the item buffer information may also be stored in the CPU memory via path 186.

As described above, the most time consuming portions of the ray-tracing calculations have been precomputed and stored in the CPU memory so that a number of images may be created quickly. Each component of the graphics pipeline of FIG. 8 may be constructed from conventional hardware, such as the conventional hardware for performing scan conversion.

The invention is also based on the observation that, where the grid cells on the hemi-polyhedron for the light buffer consists of arrays of grid cells of the same shape, the existing conventional hardware for a scan-conversion may be adopted in the image processor of FIG. 9 for constructing the list records of the grid cells. Since the grid cells are essentially identical, they may be treated in a manner similar to the polygons scanned by a conventional scan-converter. Preferably the grid cells in the hemi-polyhedron or ray-tracing schemes are regular in shape and are preferably rectangles or squares.

From the above, it is evident that the feedback path 186 in FIG. 8 allows the storage of the results of form factor calculations in radiosity techniques and light buffer calculations in ray tracing techniques. At a later time, the radiation data stored may be used to speed up the illumination calculations and shadow testing. In contrast, the conventional system of FIG. 1B does not allow for such storage.

The application also incorporates two papers submitted herewith as supplementary material to further elaborate the details of the different aspects of the invention claimed herein. These two papers are:

1. "The Hemi-cube—A Radiosity Solution for Complex Environments" by Michael F. Cohen and Donald P. Greenberg, SIGGRAPH Conference Proceedings, Vol 19, No. 3, 1985, pages 31-40.

2. "The Light Buffer; A Ray Tracer Shadow Testing Accelerator" by Eric A. Haines and Donald P. Greenberg, dated Dec. 1985.

The apparatus and methods described above are merely illustrative thereof and various changes in the details and the order of the various steps and their implementation may be within the scope of the appended claims.

We claim:

1. A method for creating a radiation image of an environment from an observation location, said environment including a plurality of surfaces, wherein the radiation image of the environment is formed at least in part by radiation per unit area received by one surface from another surface, said radiation per unit area defining a form factor between the two surfaces, said method comprising:

defining a model of the surfaces and radiation sources in the environment;

defining and determining the radiation data of the environment, said data being substantially independent of the observation location, wherein said radiation data defining and determining step defines and determines form factors for diffusive radiation received by surfaces in the environment from other surfaces in the environment, and wherein said radiation data defining and determining step includes, for each pair of a first and a second surface in the environment;

(a) defining a hemi-polyhedron having a base plane substantially coplanar with the first surface and grid cells on each plane of the hemi-polyhedron; and (b) projecting an image of the second surface onto each said plane of the polyhedron as viewed from the first surface and determining the form factor;

performing perspective transformation of the environment relative to the observation location such that the radiation arriving at the location from the environment are substantially in parallel rays;

determining the surfaces or portions thereof from which radiation is observable at the location and the intensities of such radiation using the radiation data; and displaying the radiation image.

2. The method of claim 1, said method suitable for creating a second radiation image of the environment from a second observation location, further comprising:

performing perspective transformation of the environment relative to the second observation location such that the radiation arriving at the second location from the environment are substantially in parallel rays;

determining the surfaces or portions thereof from which radiation is observable at the second location and the intensities of such radiation using the radiation data; and displaying the radiation image.

3. The method of claim 1, wherein the intensity of the radiation reflected by the surfaces or portions thereof is given by the intensity equation below:

$$I = I_a + k_d \sum_{j=1}^{m} (N \cdot L_j) + k_s \sum_{j=1}^{m} (\cos cp_j)^n,$$

where $I_a$ is the reflection due to ambient radiation, $k_d$ is the diffuse reflection constant, m is the number of radiation sources in the environment, N is the unit surface normal vector, $L_j$ is the vector in the direction of the jth radiation source, $k_s$ is the specular reflection coefficient, $p_j$ is the angle between the reflection vector of radiation from source j and the vector in the direction of the observation location, and c a constant, and n is an exponent that depends on the glossiness of the surface, and wherein said radiation data defining and determining step defines and determines the terms $$I = I_a + k_d \sum_{j=1}^{m} (N \cdot L_j) + k_s \sum_{j=1}^{m} (\cos cp_j)^n,$$

and the values of $(\cos cp_j)^n$ for a selected number of possible values of $\cos cp_j$.

4. The method of claim 3, wherein said observable surfaces and radiation intensity determining step determines the intensity from the radiation data by selecting the value of $(\cos cp_j)^n$ corresponding to the observation location and the jth radiation source, and computing the radiation observed at the location according to the intensity equation.

5. The method of claim 3, said method suitable for creating a second radiation image of the environment from a second observation location, further comprising:
performing perspective transformation of the environment relative to the second observation location such that the radiation arriving at the second location from the environment are substantially in parallel rays;
determining the surfaces or portions thereof from which radiation is observable at the second location and the intensities of such radiation using the radiation data; and
displaying the radiation image.

6. The method of claim 5, wherein for both observation locations, said observable surfaces and radiation intensity determining step determines the intensity from the radiation data by selecting the value of $(\cos cp_j)^n$ corresponding to the respective observation location and computing the radiation observed at the respective location according to the intensity equation.

7. A method for defining the form factor for diffusive radiation per unit area of a first surface received by the first surface from a second surface, said radiation per unit area defining a form factor between the two surfaces, said two surfaces being in an environment with a plurality of surfaces, said method comprising:
defining a hemi-polyhedron having a base substantially coplanar with the first surface and grid cells on each plane of the hemi-polyhedron; and
projecting an image of the second surface onto each said plane of the polyhedron as viewed from the first surface and determining the form factor.

8. The method of claim 7, wherein said projecting and determining step includes testing whether any intervening surface in the environment interferes with the diffuse radiation from the second surface traveling towards the first surface, and wherein the form factor is determined according to the result of the testing.

9. The method of claim 8, wherein said testing includes the step of detecting which surfaces are closest to the first surface and whether the second surface is the closest.

10. The method of claim 9, further comprising the step of storing the identity of the surfaces closest to the first surface.

11. The method of claim 10, wherein said detecting step also identifies which grid cells are covered by the images of the closest surfaces, and wherein said storing step stores the identity of the closest surface covering each grid cell.

12. The method of claim 7, wherein said diffusive radiation is light, heat, sound or radioactive emission.

13. The method of claim 7, wherein said hemi-polyhedron is a hemi-cube.

14. The method of claim 13, wherein the projecting and determining step projects the image of the second surface onto the hemi-polyhedron as viewed from only one point on the first surface, and wherein the defining step defines the hemi-cube so that its center coincides substantially with said point.

15. The method of claim 7, wherein the grid cells defined in the defining step are substantially of the same shape.

16. The method of claim 7, wherein the grid cells are substantially squares.

17. An apparatus for defining diffusive radiation per unit area of a first surface received by the first surface from a second surface, said radiation per unit area defining a form factor between the two surfaces, said surfaces being in an environment with a plurality of surfaces, said apparatus comprising:
means for defining a hemi-polyhedron having a base substantially coplanar with the first surface and grid cells on each plane of the hemi-polyhedron; and
means for projecting an image of the second surface onto each said plane of the polyhedron as viewed from the first surface and determining the form factor.

18. The apparatus of claim 17, wherein the grid cells defined by the defining means are substantially of the same shape.

19. The apparatus of claim 18, wherein the grid cells are substantially squares.

20. A method for defining the radiation data between a surface and a radiation source in an environment, said method comprising:
defining a polyhedron enclosing said radiation source and defining grid cells on one or more planes of the polyhedron; and
projecting an image of said surfaces onto the polyhedron in the direction of the radiation source and determining which grid cells are enclosed by or in contact with the image.

21. The method of claim 20, wherein the environment includes at least one second surface, each surface represented by an identifier, said method further comprising:
determining, for at least one grid cell, for which surfaces the cell is enclosed by or in contact with the images of said surfaces, and the depth values defined as the distances or relative distances between said surfaces and the radiation source; and
storing the identities of said surfaces and their depth values as a record list for each grid cell.

22. The method of claim 21, wherein the records on said surfaces and their distances from the radiation source are stored in an ascending order of their depth values.

23. The method of claim 21, further comprising:
testing whether a grid cell is entirely enclosed by the image of at least one surface opaque to the radiation in the environment, and identifying the record for such surface as a full occlusion record; and
detecting all records of surfaces which are at greater depth values than the surface which has the smallest depth value and which has a full occlusion record, and deleting the records so detected.

24. The method of claim 20, wherein the determining step includes:
applying a visible surface algorithm to determine which grid cells contain or are in contact with the image.

25. The method of claim 20, wherein the environment includes at least one second surface, each surface represented by an identifier, said method further comprising:
defining a bounding volume to enclose the second surface, said bounding volume represented by an identifier;
projecting an image of said bounding volume onto the polyhedron in the direction of the radiation source and determining which grid cells are enclosed by or in contact with the image of the volume;
determining, for at least one grid cell, (a) whether the cell is within or in contact with the image of the surface projected upon the polyhedron, and determining the distance of relative distance between the radiation source and the surface when the cell is within or in contact with the image, and (b) whether the cell is within or in contact with the image of the volume projected upon the polyhedron, and determining the distance or relative distance between the radiation source and the volume when the cell is within or in contact with the image of the volume; and
storing the identifiers of said surface and said bounding volume and their distances or relative distances from the radiation source in a record list for such grid cell.

26. The method of claim 20, wherein said radiation is light, heat, sound or radioactive emission.

27. The method of claim 20, wherein said polyhedron is a cube.

28. The method of claim 21, wherein the defining step defines the cube so that its center coincides substantially with said radiation source.

29. The method of claim 20, wherein the grid cells defined in the defining step are substantially of the same shape.

30. The method of claim 20, wherein the grid cells are substantially squares.

31. An apparatus or defining radiation data between a plurality of surfaces and a radiation source in an environment, said apparatus comprising:
means for defining a polyhedron enclosing said radiation source and defining grid cells on at least one plane of the polyhedron;
means for projecting an image of each surface onto the polyhedron in the direction of the radiation source and determining which grid cells are enclosed by or in contact with the image; and
means for determining the distances or relative distance between each surface enclosed by or in contact with the image and the source to define the radiation data.

32. The apparatus of claim 31, wherein the grid cells defined by the defining means are substantially of the same shape.

33. The apparatus of claim 32, wherein the grid cells are substantially squares.

34. A method for determining the intensity of radiation observed at a location in an environment, said environment having at least one radiation source and two or more surfaces each represented by an identifier, wherein said method uses radiation data of the environment, said data having been defined by (a) defining a polyhedron enclosing said light source and defining grid cells on the planes of the polyhedron between the light source and the surfaces, (b) projecting images of said surfaces onto the polyhedron in the direction of the radiation source, and determining which grid cells are enclosed by or in contact with the images and the depth values defined as the distances or relative distances between said surfaces and the radiation source, and (c) storing the identifiers of said surfaces and their depth values as a record list for each such grid cell; said method comprising:
(i) finding, on a surface by surface basis, which surfaces are closest to the location so that the radiation from these surfaces are observable at the location;
(ii) tracing a line from the observation location to a point on a surface to define an intersection point;
(iii) determining which grid cell intersects the line connecting the radiation source and the intersection point;
(iv) comparing the distance between the intersection point and the radiation source to the depth values in the record list for such grid cell to determine whether radiation from the source is interfered with by any surface in the environment when traveling towards the intersection point;
(v) computing the intensity of radiation reflected at or emitted by the intersection point towards the location; and
(vi) repeating the steps (ii) through (v) for each of the surfaces and summing the intensities of radiation reflected at the intersection points to obtain the intensity of radiation observed at the location from the environment.

35. The method of claim 34, wherein the radiation data of the environment is so defined that the records on the surfaces in the environment and their depth values are stored in an ascending order of their magnitude, and wherein the comparing step compares the distance between the intersection point and the radiation source to depth values in the record in the ascending order.

36. The method of claim 35, wherein the comparing step is performed in said ascending order until the distance between the intersection point and the radiation source is less than the next depth value stored in the record, upon which the step is terminated.

37. The method of claim 34, wherein the radiation data of the environment is so defined that the identifiers of the surfaces in the environment and their depth values are stored in the list records of the grid cells in an ascending order of their magnitudes, wherein the radiation data is defined also by (a) testing whether a grid cell is entirely enclosed by the image of at least one surface opaque to the radiation in the environment, (b) identifying the record for such surface as a full occlusion record, (c) detecting all records of surfaces which are at greater depth values than the surface which has the smallest depth value and which has a full occlusion record, and (d) deleting the records so detected, wherein the comparing step includes:

relating the distance between the intersection point and the radiation source to the depth value in the full occlusion record, if any, and terminating the comparing step when the distance between the intersection point and the radiation source is greater than the depth value in the full occlusion record; and relating the distance between the intersection point and the radiation source to the depth values in the record in the ascending order.

38. The method of claim 34, wherein at least one of the closest surfaces to the location is non-specular, and wherein said computing step computes the ambient and direct diffuse reflection components of the radiation intensity emitted by the surface towards the location.

39. The method of claim 34, wherein at least one of the closest surfaces to the location is specular, and wherein said computing step computes the ambient, direct diffuse and direct specular reflection components of the radiation intensity emitted by the surface towards the location.

40. The method of claim 39, further comprising:

defining a picture plane having pixels therein with a selected resolution; and applying a scan conversion algorithm to determine the pixels covered by the closest surface for which the line is traced, wherein said tracing step is performed by tracing the line from the location through a predetermined point in a pixel and finding the intersection point between said line and the closest surface; and repeating the line tracing step for each pixel covered by said closest surface to determine the intersection points on the closest surface;

repeating the determining step (iii), comparing step (iv) and computing step (v) for each intersection point on the closest surface, and wherein said summing step (vi) is performed on a pixel by pixel basis.

41. The method of claim 40, further comprising storing the pixels covered by the closest surface determined by the scan conversion in a memory.

42. A method for determining the intensity of radiation observed at a location in an environment, said environment having at least one radiation source and two or more surfaces each represented by an identifier, wherein said method uses radiation data of the environment, said data having been defined by (a) defining a polyhedron enclosing said radiation source and defining grid cells on the planes of the polyhedron between the radiation source and the surfaces, (b) projecting images of said surfaces onto the polyhedron in the direction of the radiation source, and determining which grid cells are enclosed by or in contact with the images and the depth values defined as the distances or relative distances between said surfaces and the radiation source, and (c) storing the identifiers of said surfaces and their depth values as a record list for each such grid cell; said method comprising:

(i) defining a picture plane having pixels therein with a predetermined size; and (ii) applying a scan conversion algorithm to determine which surfaces are closest to the location, and the pixels covered by each of the closest surface;

(iii) for each of the surfaces, tracing a line from the observation location to a predetermined point in a pixel covered by one of the surfaces and determining the intersection point between such line and said one surface to determine the intersection points on said one closest surface;

(iv) shadow testing each intersection point by determining which grid cell intersects the line connecting the radiation source and the intersection point, and by comparing the distance between the intersection point and the radiation source to the depth values in the record list for such grid cell to determine whether radiation from the source is interfered with by any surface in the environment when traveling towards the intersection point;

(v) computing, for at least some pixels, the intensity of radiation reflected at or emitted by each intersection point towards the location; and (vi) displaying the intensities of radiation computed for each pixel to produce the radiation image.

43. The method of claim 42, further comprising:

storing, on a pixel basis and in a frame buffer, the intensity of radiation reflected at or emitted by each intersection point towards the location;

storing in an item buffer the identifiers of the closest surfaces and the pixels covered by each of the closest surfaces;

retrieving the pixels covered by one of the closest surface defining a specularly reflecting surface;

determining the mirror image of the observation location across said specularly reflecting surface to define the mirage point of the location and determining the mirror image of the picture plane and the pixels therein across said specularly reflecting surface to define the mirage picture plane and the mirage pixels;

defining a bounding box for the specularly reflecting surface;

clipping and scan converting the environment with respect to the bounding box to determine the closest surfaces to the mirage point, the mirage pixels covered by each such surface;

for each of the closest surfaces to the mirage point, tracing a line from the mirage point to a predetermined point in a mirage pixel covered by such surface and determining the mirage intersection point between such line and such surface to determine the mirage intersection points on such surface;

shadow testing each mirage intersection point on such surface by determining which grid cell intersects the line connecting the radiation source and the mirage intersection point and the radiation source to the depth values in the record list for such grid cell to determine whether radiation from the source is interfered with by any surface in the environment when traveling towards the mirage intersection point;

computing, for at least some mirage pixels, the intensity of radiation reflected at or emitted by each such mirage intersection point and reflected by said specularly reflecting surface towards the location; and adding the intensity of radiation for each mirage pixel computed to the intensity value for the corresponding pixel stored in the frame buffer.

44. The method of claim 42, further comprising:

storing, on a pixel by pixel basis and in a frame buffer, the intensity of radiation reflected at or emitted by each intersection point towards the location;

storing in an item buffer the intensities of the closest surfaces and the pixels covered by each of the closest surfaces;

testing whether one of the closest surface is at least partially transparent;

retrieving the pixels covered by said one closest surface defining a transmitting surface;

defining a bounding box for the transmitting surface;

removing said transmitting surface from the environment;

clipping and scan converting the environment with respect to the bounding box to determine the closest surfaces to the observation location, and the pixels covered by each such surface;

for each of such surface, tracing a line from the observation location to a predetermined point in a pixel covered by such surface and determining the intersection point between such line and such surface to determine the intersection points from which radiation is observable through the transmitting surface;

shadow testing each intersection point in the group on such surface by determining which grid cell intersects the line connecting the radiation source and each intersection point in the group, and by comparing the distance between each intersection point in the group and the radiation source to the depth values in the record list for such grid cell to determine whether radiation from the source is interfered with by any surface in the environment when traveling towards each intersection point in the group;

computing, on a mirage pixel by mirage pixel basis, the intensity of radiation reflected at or emitted by each such intersection point in the group and reflected by said specularly reflecting surface towards the location; and adding the intensity of radiation computed in the computing step to the intensity value for the same pixel stored in the frame buffer.

45. An apparatus for producing radiation images of an environment having at least one radiation source and at least one surface, comprising
- a computer for defining a model of the environment;
- a floating point accelerator for performing geometric transformations of the environment according to the model;
- an image processor for determining radiation per unit area received by one surface from another surface defining a form factor between the surfaces or the depth relationship of surfaces relative to radiation sources;
- a memory for storing the results of the determination of the form factors or the depth relationship; and
- means for displaying radiation images.

46. The apparatus of claim 45, wherein said memory comprises a local storage device and wherein said computer includes an image processor, said apparatus further comprising a path from the local storage device to the computer memory for storing the results of the form factor or the depth relationship determination, so that the results are easily retrievable for producing radiation images.

47. The apparatus of claim 45, wherein said image processor is characterized in that it stores intensity, depth or identifying information of polygons, surfaces or objects.

48. An apparatus for determining the intensity of radiation observed at a location in an environment, said environment having at least one radiation source and two or more surfaces each represented by an identifier, wherein said method uses radiation data of the environment, said data having been defined by (a) defining a polyhedron enclosing said light source and defining grid cells on the planes of the polyhedron between the light source and the surfaces, (b) projecting images of said surfaces onto the polyhedron in the direction of the radiation source, and determining which grid cells are enclosed by or in contact with the images and the depth values defined as the distances or relative distances between said surfaces and the radiation source, and (c) storing the identifiers of said surfaces and their depth values as a record list for each such grid cell; said apparatus comprising:

(i) means for finding, on a surface by surface basis, which surfaces are closest to the location so that the radiation from these surfaces are observable at the location;

(ii) means for tracing a line from the observation location to a point on a surface to define an intersection point;

(iii) means for determining which grid cell intersects the line connecting the radiation source and the intersection point;

(iv) means for comparing the distance between the intersection point and the radiation source to the depth values in the record list for such grid cell to determine whether radiation from the source is interfered with by any surface in the environment when traveling towards the intersection point;

(v) means for computing the intensity of radiation reflected at or emitted by the intersection point towards the location; and (vi) means for summing the intensities of radiation reflected at the intersection points to obtain the intensity of radiation observed at the location from the environment.

49. The apparatus of claim 48, wherein the radiation data of the environment is so defined that the records on the surfaces in the environment and their depth values are stored in an ascending order of their magnitude, and wherein the comparing means compares the distance between the intersection point and the radiation source to depth values in the record in the ascending order.

50. The apparatus of claim 49, wherein the comparing means performs the comparison in said ascending order until the distance between the intersection point and the radiation source is less than the next depth value stored in the record, upon which the comparison stops the comparison.

51. An apparatus for determining the intensity of radiation observed at a location in an environment, said environment having at least one radiation source and two or more surfaces each represented by an identifier, wherein said method uses radiation data of the environment, said data having been defined by (a) defining a polyhedron enclosing said light source and defining grid cells on the planes of the polyhedron between the light source and the surfaces, (b) projecting images of said surfaces onto the polyhedron in the direction of the radiation source, and determining which grid cells are enclosed by or in contact with the images and the depth values defined as the distances or relative distances between said surfaces and the radiation source, and (c) storing the identifiers of said surfaces and their depth values as a record list for each such grid cell; said apparatus comprising:

(i) means for defining a picture plane having pixels therein with a predetermined size; and (ii) means for applying a scan conversion algorithm to determine which surfaces are closest to the location, and the pixels covered by each of the closest surface;

(iii) means for tracing, for each of the surfaces, a line from the observation location to a predetermined point in a pixel covered by one of the surfaces and determining the intersection point between such line and said one surface to determine the intersection points on said surface;

(iv) means for shadow testing each intersection point by determining which grid cell intersects the line connecting the radiation source and the intersection point, and by comparing the distance between the intersection point and the radiation source to the depth values in the record list for such grid cell to determine whether radiation from the source is interfered with by any surface in the environment when traveling towards the intersection point;

(v) means for computing, on a pixel by pixel basis, the intensity of radiation reflected at or emitted by each intersection point towards the location; and (vi) means for displaying the intensities of radiation computed for each pixel to produce the radiation image.

52. The apparatus of claim 51, further comprising:

a frame buffer storing, on a pixel by pixel basis, the intensity of radiation reflected at or emitted by each intersection point towards the location;

an item buffer storing the identifiers of the closest surfaces and the pixels covered by each of the closest surfaces;

means for retrieving the pixels covered by one of the closest surfaces defining a specularly reflecting surface;

means for determining the mirror image of the observation location across said specularly reflecting surface to define the mirage point of the location and determining the mirror image of the picture plane and the pixels therein across said specularly reflecting surface to define the mirage picture plane and the mirage pixels;

means for defining a bounding box for the specularly reflecting surface;

means for clipping and scan converting the environment with respect to the bounding box to determine the closest surfaces to the mirage point, the mirage pixels covered by each such surface;

means for tracing a line from the mirage point to a predetermined point in a mirage intersection point between such line and such surface to determine the mirage intersection points on such surface;

means for shadow testing each mirage intersection point on such surface by determining which grid cell intersects the line connecting the radiation source and the mirage intersection point, and by comparing the distance between the mirage intersection point and the radiation source to the depth values in the record list for such grid cell to determine whether radiation from the source is interfered with by any surface in the environment when traveling towards the mirage intersection point;

means for computing, on a mirage pixel by mirage pixel basis, the intensity of radiation reflected at or emitted by each such mirage intersection point and reflected by said specularly reflecting surface towards the location; and means for adding the intensity of radiation computed for each mirage pixel to the intensity value for the corresponding pixel stored in the frame buffer.

53. The apparatus of claim 51, further comprising:

a frame buffer storing, on a pixel by pixel basis, the intensity of radiation reflected at or emitted by each intersection point towards the location;

an item buffer storing the identities of the closest surfaces and the pixels covered by each of the closest surfaces;

means for testing whether one of the closest surface is at least partially transparent;

means for retrieving the pixels covered by said one closest surface defining a transmitting surface;

means for defining a bounding box for the transmitting surface;

means for removing said transmitting surface from the environment;

means for clipping and scan converting the environment with respect to the bounding box to determine the closest surfaces to the observation location, and the pixels covered by each such surface;

means for tracing a line from the observation location to a predetermined point in a pixel covered by each such surface and determining the intersection point between such line and such surface to determine the intersection points on such surface, such intersecting points defining a group of points from which radiation is observable through the transmitting surface;

means for shadow testing each intersection point in the group on such surfaces by determining which grid cell intersects the line connecting the radiation source and the intersection point in the group, and by comparing the distance between the intersection point in the group and the radiation source to the depth values in the record list for such grid cell to determine whether radiation from the source is interfered with by any surface in the environment when traveling towards the intersection point in the group;

means for computing, on a mirage pixel basis, the intensity of radiation reflected at or emitted by each such intersection point in the group and reflected by said specularly reflecting surface towards the location; and means for adding the intensity of radiation computed by the computing means to the intensity value for the same pixel stored in the frame buffer.

* * * * *

UNITED STATES PATENT AND TRADEMARK OFFICE
CERTIFICATE OF CORRECTION

PATENT NO. : 4,928,250

DATED : May 22, 1990

INVENTOR(S) : Donald Greenberg, Michael Cohen and Eric Haines

It is certified that error appears in the above-identified patent and that said Letters Patent is hereby corrected as shown below:

In Claim Number 3, Column 23, Line 16,

"$I = I_a + k_d \sum_{j=1}^{m} (N \cdot L_j) + k_s \sum_{j=1}^{m} (\cos cp_j)^n,$"

should read -- $I_a, k_d \sum_{j=1}^{m} (N \cdot L_j)$ --;

In Claim Number 43, Column 28, Line 50, between "point" and "and", it should read --,and by comparing the distance between the mirage intersection point --;

In Claim Number 44, Column 29, Line 19, between "points" and "from", it should read -- on such surface, such intersecting points

UNITED STATES PATENT AND TRADEMARK OFFICE
CERTIFICATE OF CORRECTION

PATENT NO. : 4,928,250

DATED : May 22, 1990

INVENTOR(S) : Donald Greenberg, Michael Cohen and Eric Haines

Page 2 of 2

It is certified that error appears in the above-identified patent and that said Letters Patent is hereby corrected as shown below:

defining a group of points--.

Signed and Sealed this

Seventh Day of January, 1992

Attest:

HARRY F. MANBECK, JR.

*Attesting Officer*  *Commissioner of Patents and Trademarks*